United States Patent
Shi et al.

(10) Patent No.: US 10,757,567 B2
(45) Date of Patent: Aug. 25, 2020

(54) DUAL CONNECTIVITY REPORTING OF A CHANGE IN USER EQUIPMENT MEASUREMENT CAPABILITY

(71) Applicant: QUALCOMM Incorporated, San Diego, CA (US)

(72) Inventors: Yongsheng Shi, San Diego, CA (US); Masato Kitazoe, Hachiouji (JP); Leena Zacharias, San Jose, CA (US); Aziz Gholmieh, Del Mar, CA (US); Reza Shahidi, San Diego, CA (US); Shanshan Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 49 days.

(21) Appl. No.: 16/144,966

(22) Filed: Sep. 27, 2018

(65) Prior Publication Data
US 2019/0098489 A1    Mar. 28, 2019

Related U.S. Application Data

(60) Provisional application No. 62/564,971, filed on Sep. 28, 2017.

(51) Int. Cl.
*H04W 8/24* (2009.01)
*H04W 24/10* (2009.01)
(Continued)

(52) U.S. Cl.
CPC .............. *H04W 8/24* (2013.01); *H04W 24/10* (2013.01); *H04W 28/08* (2013.01);
(Continued)

(58) Field of Classification Search
CPC ... H04W 8/24; H04W 28/08; H04W 36/0085; H04W 24/10; H04W 72/0453;
(Continued)

(56) References Cited

U.S. PATENT DOCUMENTS

2015/0327104 A1   11/2015   Yiu et al.
2016/0219475 A1*  7/2016    Kim .................. H04L 5/00
(Continued)

FOREIGN PATENT DOCUMENTS

| WO | 2015167303 A1 | 11/2015 |
| WO | 2016182527 A1 | 11/2016 |
| WO | 2017033568 A1 | 3/2017 |

OTHER PUBLICATIONS

International Search Report and Written Opinion—PCT/US2018/053463—ISA/EPO—dated Dec. 14, 2018.

*Primary Examiner* — Walter J Divito
(74) *Attorney, Agent, or Firm* — Loza & Loza, LLP

(57) ABSTRACT

Aspects of the disclosure relate to dual connectivity reporting. In one example, a dual connectivity communication is established, which includes a communication with a master node according to a first radio access technology (RAT), and a communication with a secondary node according to a second RAT. A change in measurement capability is then detected, and subsequently reported to the master node and/or secondary node. In another example, a scheduling entity establishes a first or second communication of a dual connectivity communication with a scheduled entity. The first communication is established according to a first RAT when operating as a master node, and the second communication is established according to a second RAT when operating as a secondary node. An indication is then received from the scheduled entity of a change in measurement capability, and the first and/or second communications are reconfigured in response to the change in measurement capability.

30 Claims, 17 Drawing Sheets

(51) Int. Cl.
   *H04W 72/04*     (2009.01)
   *H04W 72/12*     (2009.01)
   *H04W 76/15*     (2018.01)
   *H04W 28/08*     (2009.01)
   *H04W 36/00*     (2009.01)
   *H04W 88/06*     (2009.01)

(52) U.S. Cl.
   CPC ... *H04W 36/0085* (2018.08); *H04W 72/0453* (2013.01); *H04W 72/1278* (2013.01); *H04W 76/15* (2018.02); *H04W 36/0069* (2018.08); *H04W 88/06* (2013.01)

(58) Field of Classification Search
   CPC . H04W 72/1278; H04W 76/15; H04W 88/06; H04W 36/0069
   See application file for complete search history.

(56)          References Cited

U.S. PATENT DOCUMENTS

2018/0034598 A1*  2/2018  Yiu .................. H04W 24/10
2018/0132258 A1   5/2018  Andou et al.
2019/0059105 A1*  2/2019  Harada ............... H04W 16/10

* cited by examiner

DUAL CONNECTIVITY REPORTING OF A CHANGE IN USER EQUIPMENT MEASUREMENT CAPABILITY

CROSS-REFERENCE TO RELATED APPLICATIONS

The application claims priority to and the benefit of U.S. provisional patent application No. 62/564,971 filed on Sep. 28, 2017, the entire content of which is incorporated herein by reference as if fully set forth below in its entirety and for all applicable purposes.

TECHNICAL FIELD

The technology discussed below relates generally to wireless communication systems, and more particularly, to a dual connectivity reporting of a change in user equipment measurement capability.

INTRODUCTION

As the demand for mobile broadband access continues to increase, research and development continue to advance wireless communication technologies not only to meet the growing demand for mobile broadband access, but to advance and enhance the user experience with mobile communications. With the imminent deployment of 5G New Radio (NR) nodes, it is anticipated that future user equipment (UE) designs will have dual connectivity functionality. Namely, it is anticipated that UEs will simultaneously communicate with nodes having different radio access technologies (RATs). For instance, a UE may simultaneously communicate with a first node utilizing a Long Term Evolution (LTE) RAT (e.g., a communication with an evolved node B (eNB)) and a second node utilizing a 5G NR RAT (e.g., a communication with a next generation node B (gNB)).

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Various aspects directed towards reporting a change in measurement capability of a scheduled entity are disclosed. Various aspects directed towards coordinating a master node and a secondary node in response to a change in measurement capability of a scheduled entity are also disclosed.

In one example, a dual connectivity communication is established between a scheduled entity and a network. Within such example, the dual connectivity communication includes a first communication with a master node according to a first radio access technology (RAT), and a second communication with a secondary node according to a second RAT. In this example, a change in measurement capability associated with at least one of the first communication with the master node or the second communication with the secondary node is then detected, which is subsequently reported to at least one of the master node or the secondary node.

In another example, a scheduled entity is disclosed, which includes each of a communication circuitry, a detection circuitry, and a reporting circuitry. For this example, the communication circuitry can be configured to establish a dual connectivity communication with a network, which includes a first communication with a master node according to a first RAT, and a second communication with a secondary node according to a second RAT. The detection circuitry can be configured to detect a change in measurement capability associated with at least one of the first communication with the master node or the second communication with the secondary node. Furthermore, the reporting circuitry can be configured to report the change in measurement capability to at least one of the master node or the secondary node.

An exemplary method operable at a scheduling entity is also disclosed, which includes establishing a communication with a scheduled entity in which the communication is one of a first communication or a second communication of a dual connectivity communication with the scheduled entity. For this example, the first communication is a communication with the scheduled entity according to a first RAT when the scheduling entity operates as a master node, and the second communication is a communication with the scheduled entity according to a second RAT when the scheduling entity operates as a secondary node. The method further includes receiving an indication from the scheduled entity of a change in measurement capability associated with at least one of the first communication or the second communication. The method also includes reconfiguring at least one of the first communication or the second communication in response to the change in measurement capability.

In another example, a scheduling entity is disclosed, which includes each of a communication circuitry, an indication circuitry, and a reconfiguration circuitry. For this example, the communication circuitry can be configured to establish a communication with a scheduled entity in which the communication is one of a first communication or a second communication of a dual connectivity communication with the scheduled entity. Here, the first communication is a communication with the scheduled entity according to a first RAT when the scheduling entity operates as a master node, and the second communication is a communication with the scheduled entity according to a second RAT when the scheduling entity operates as a secondary node. The indication circuitry can be configured to receive an indication from the scheduled entity of a change in measurement capability associated with at least one of the first communication or the second communication, whereas the reconfiguration circuitry can be configured to reconfigure at least one of the first communication or the second communication in response to the change in measurement capability.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed

DETAILED DESCRIPTION

Figure 1:
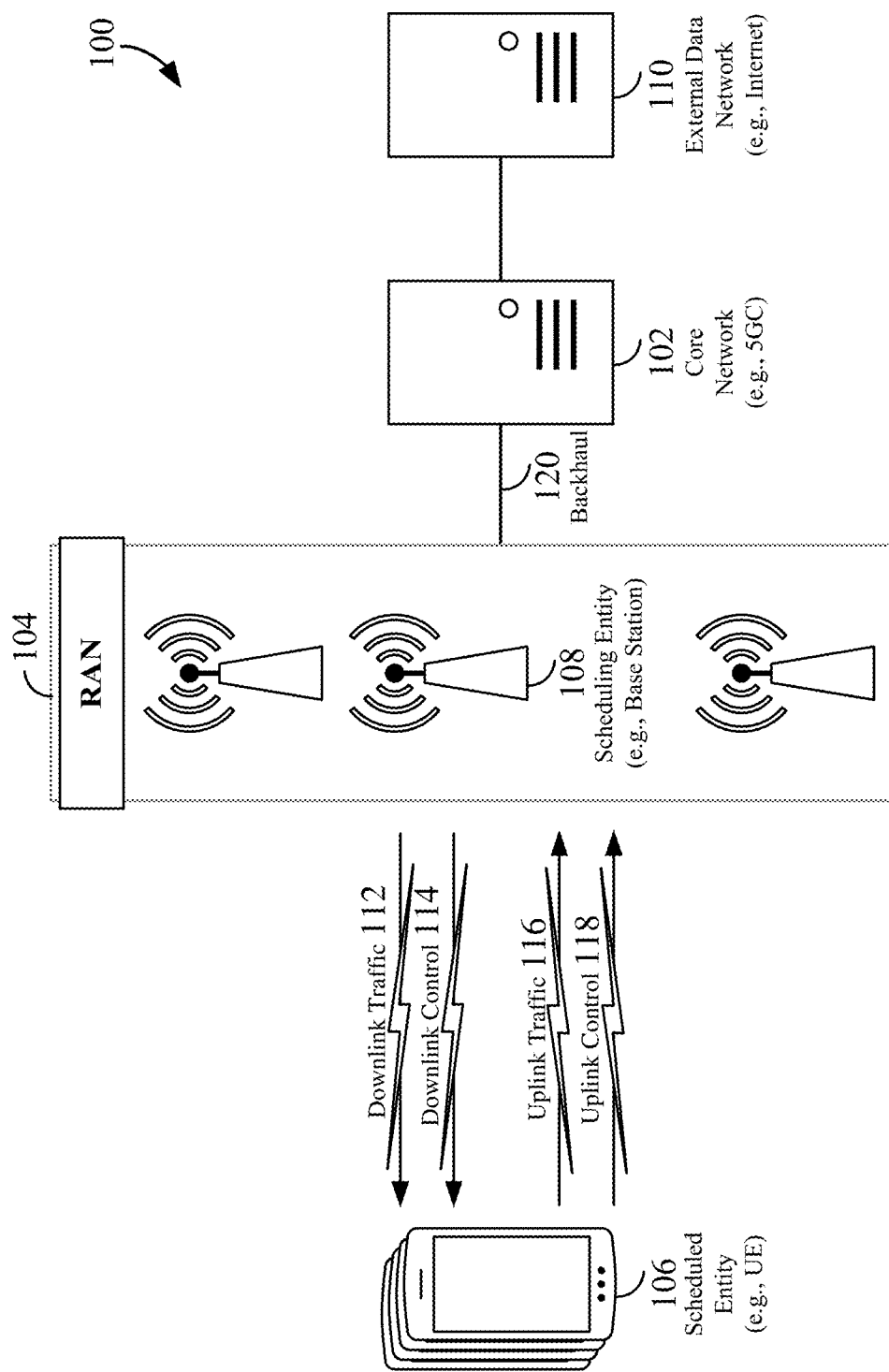
FIG. 1 is a schematic illustration of a wireless communication system according to some embodiments.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

As previously stated, in response to the deployment of 5G New Radio (NR) nodes, it is anticipated that future user equipment (UE) designs will have dual connectivity functionality in which the UE simultaneously communicates with nodes having different radio access technologies (RATs). In particular, E-UTRA-NR Dual Connectivity (EN-DC) functionality is anticipated in which a UE may simultaneously communicate with a first node utilizing a Long Term Evolution (LTE) RAT (e.g., a communication with an evolved node B (eNB)) and a second node utilizing a 5G NR RAT (e.g., a communication with a next generation node B (gNB)).

For EN-DC, it is further anticipated that the LTE node may be configured to operate as a "master" node (MeNB), whereas the NR node may be configured to operate as a "secondary" node (SgNB). Here, unlike LTE Dual Connectivity (LTE DC), the secondary node in EN-DC may add/remove secondary cells by itself without notifying the master node. As will be discussed further below, however, the addition/removal of secondary cells may affect the measurement capability of the UE. To measure a frequency, for instance, the addition of a secondary cell may require the UE to perform measurements according to a particular measurement gap configuration. Moreover, whereas the UE may have had radio resources to perform a particular frequency measurement prior to the addition of the secondary cell (e.g., where no measurement gap may have been needed to perform measurement), such radio resources may be needed for the newly added cell after it is added (i.e., resulting in a measurement gap now being needed to perform measurement). Aspects disclosed herein are thus directed towards having a UE efficiently report changes in measurement capability to both a master node and a secondary node. Namely, aspects disclosed herein are directed towards measurement capability reporting in cases where a change in measurement capability of a UE initiated by one cell group may effect operation of the UE assumed by another cell group.

In another aspect disclosed herein it is noted that, when both master cell group (MCG) carriers and secondary cell group (SCG) carriers need to open a gap for measurement, the master node and secondary node may need to coordinate to manage gaps on both the MCG and the SCG, which is not required in LTE-DC. Namely, if such gaps are opened separately on MCG and SCG, the UE will undesirably observe throughput loss and become out-of-sync with the network. Accordingly, as will be discussed in further detail below, aspects disclosed herein are also directed towards coordinating gaps of an MCG and SCG so that such gaps are aligned when a measurement gap is needed in both the MCG and SCG.

Definitions

RAT: radio access technology. The type of technology or communication standard utilized for radio access and communication over a wireless air interface. Just a few examples of RATs include GSM, UTRA, E-UTRA (LTE), Bluetooth, and Wi-Fi.

NR: new radio. Generally refers to 5G technologies and the new radio access technology undergoing definition and standardization by 3GPP in Release 15.

Legacy compatibility: may refer to the capability of a 5G network to provide connectivity to pre-5G devices, and the capability of 5G devices to obtain connectivity to a pre-5G network.

Measurement Gap: periods that a UE may use to perform measurements in which no uplink or downlink transmissions are scheduled.

Multimode device: a device that can provide simultaneous connectivity across different networks, such as 5G, 4G, and Wi-Fi networks.

MR-AN: multi-RAT radio access network. A single radio access network may provide one or more cells for each of a plurality of RATs, and may support inter- and intra-RAT mobility and aggregation.

MR-CN: multi-RAT core network. A single, common core network may support multiple RATs (e.g., 5G, LTE, and WLAN). In some examples, a single 5G control plane may support the user planes of a plurality of RATs by utilizing software-defined networking (SDN) technology in the core network.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to $3^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards. And in some cases, a mobile apparatus may also be referred as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE can be an apparatus that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled. A a scheduling entity (e.g., a base station 108) can allocate resources for communication among some or all devices and equipment within its service area or cell. Within the present disclosure and in some scenarios, as discussed further below, a scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., a 5G Core Network designed to support throughput, latency, and mobility requirements of different service categories with the introduction of a Services Based Architecture (SBA) and Control and User Plane Separation (CUPS)). In other examples, the core network 102 may be configured according to a 4G evolved packet core (EPC), or any other suitable standard or configuration.

Figure 2:
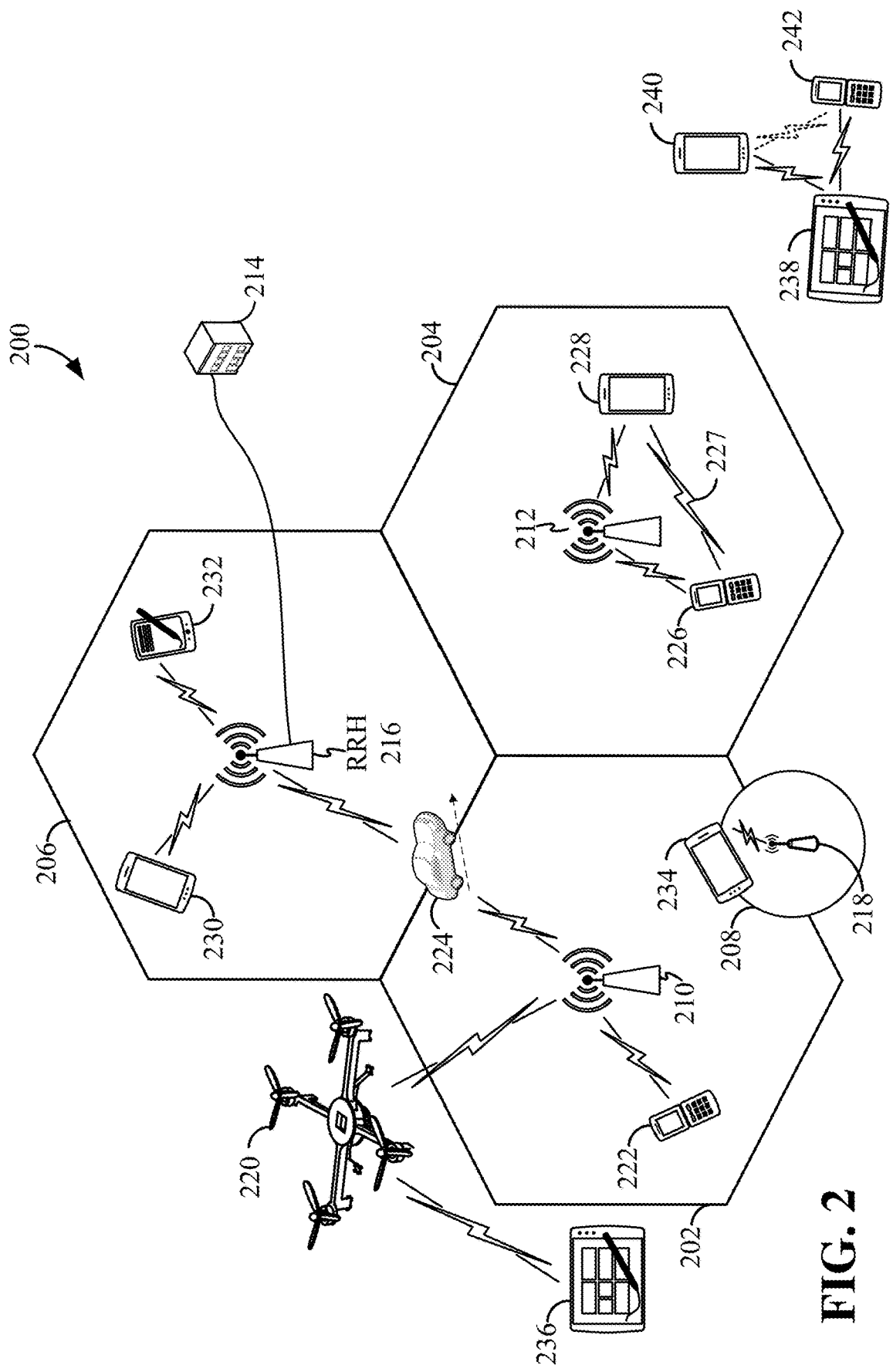
FIG. 2 is a conceptual illustration of an example of a radio access network according to some embodiments.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

The radio access network 200 may include any number of wireless base stations, nodes, and cells. As one example, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220. Though not shown, the drone 220 may also be other types of vehicles, including but not limited to, high altitude crafts, aerial-based vehicles, land-based vehicles, or water-going vehicles.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., quadcopter 220) may be configured to function as a UE. For example, the quadcopter 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity 238. Thus, in a wireless communication system with scheduled access to time-frequency resources and having a cellular configuration, a P2P configuration, or a mesh configuration, a scheduling entity and one or more scheduled entities may communicate utilizing the scheduled resources.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1). Mobility features may also include a security context management function (SCMF) that manages the security context for both the control plane and the user plane functionality, and a security anchor function (SEAF) that performs authentication.

In various aspects of the disclosure, a radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the radio access network 200 may utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

Figure 3:
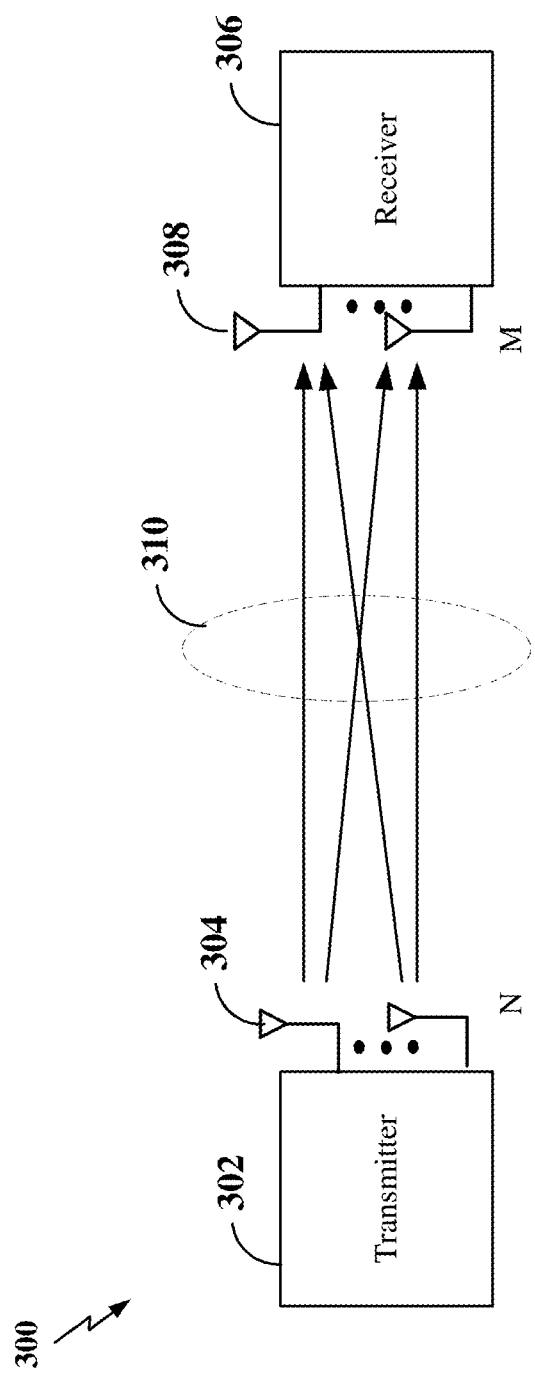
FIG. 3 is a block diagram illustrating a wireless communication system supporting multiple-input multiple-output (MIMO) communication according to some embodiments.

In some aspects of the disclosure, the scheduling entity and/or scheduled entity may be configured for beamforming and/or multiple-input multiple-output (MIMO) technology. FIG. 3 illustrates an example of a wireless communication system 300 supporting MIMO. In a MIMO system, a transmitter 302 includes multiple transmit antennas 304 (e.g., N transmit antennas) and a receiver 306 includes multiple receive antennas 308 (e.g., M receive antennas). Thus, there are N×M signal paths 310 from the transmit antennas 304 to the receive antennas 308. Each of the transmitter 302 and the receiver 306 may be implemented, for example, within a scheduling entity 108, a scheduled entity 106, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system 300 is limited by the number of transmit or receive antennas 304 or 308, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In Time Division Duplex (TDD) systems, the UL and DL are reciprocal, in that each uses different time slots of the same frequency bandwidth. Therefore, in TDD systems, the base station may assign the rank for DL MIMO transmissions based on UL SINR measurements (e.g., based on a Sounding Reference Signal (SRS) transmitted from the UE or other pilot signal). Based on the assigned rank, the base station may then transmit the CSI-RS with separate C-RS sequences for each layer to provide for multi-layer channel estimation. From the CSI-RS, the UE may measure the channel quality across layers and resource blocks and feed back the CQI and RI values to the base station for use in updating the rank and assigning REs for future downlink transmissions.

In the simplest case, as shown in FIG. 3, a rank-2 spatial multiplexing transmission on a 2×2 MIMO antenna configuration will transmit one data stream from each transmit antenna 304. Each data stream reaches each receive antenna 308 along a different signal path 310. The receiver 306 may then reconstruct the data streams using the received signals from each receive antenna 308.

In order for transmissions over the radio access network 200 to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

According to 5G NR specifications, user data is coded using quasi-cyclic low-density parity check (LDPC) with two different base graphs. One base graph can be used for large code blocks and/or high code rates, and another base graph can be used otherwise. Of course, other use cases may be implemented with differing types of base graph combinations. Control information and the physical broadcast channel (PBCH) are coded using Polar coding, based on nested sequences. For these channels, puncturing, shortening, and repetition are used for rate matching.

However, those of ordinary skill in the art will understand that aspects of the present disclosure may be implemented utilizing any suitable channel code. Various implementations of scheduling entities 108 and scheduled entities 106 may include suitable hardware and capabilities (e.g., an encoder, a decoder, and/or a CODEC) to utilize one or more of these channel codes for wireless communication.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier I-DMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Various aspects of the present disclosure will be described with reference to an OFDM waveform, schematically illustrated in FIG. 4. It should be understood by those of ordinary skill in the art that the various aspects of the present disclosure may be applied to a DFT-s-OFDMA waveform in substantially the same way as described herein below. That is, while some examples of the present disclosure may focus on an OFDM link for clarity, it should be understood that the same principles may be applied as well to DFT-s-OFDMA waveforms.

Within the present disclosure, a frame generally refers to a logical segment of transmission of a particular time interval. As one example configuration, a frame can refer to a duration of 10 ms for wireless transmissions, with each frame consisting of 10 subframes of 1 ms each. On a given carrier, there may be one set of frames in the UL, and another set of frames in the DL. Referring now to FIG. 4, an expanded view of an exemplary DL subframe 402 is illustrated, showing an OFDM resource grid 404. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers or tones.

The resource grid 404 may be used to schematically represent time-frequency resources for a given antenna port. That is, in a MIMO implementation with multiple antenna ports available, a corresponding multiple number of resource grids 404 may be available for communication. The resource grid 404 is divided into multiple resource elements (REs) 406. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) 408 or more simply a resource block (RB) 408, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 408 entirely corresponds to a single direction of communication (either transmission or reception for a given device).

A UE generally utilizes only a subset of the resource grid 404. An RB may be the smallest unit of resources that can be allocated to a UE. Thus, the more RBs scheduled for a UE, and the higher the modulation scheme chosen for the air interface, the higher the data rate for the UE.

In this illustration, the RB 408 is shown as occupying less than the entire bandwidth of the subframe 402, with some subcarriers illustrated above and below the RB 408. In a given implementation, the subframe 402 may have a bandwidth corresponding to any number of one or more RBs 408. Further, in this illustration, the RB 408 is shown as occupying less than the entire duration of the subframe 402, although this is merely one possible example.

Each 1 ms subframe 402 may consist of one or multiple adjacent slots. In the example shown in FIG. 4, one subframe 402 includes four slots 410, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., one or two OFDM symbols). These mini-slots may in some cases be transmitted occupying resources scheduled for ongoing slot transmissions for the same or for different UEs.

An expanded view of one of the slots 410 illustrates the slot 410 including a control region 412 and a data region 414. In general, the control region 412 may carry control channels (e.g., PDCCH), and the data region 414 may carry data channels (e.g., PDSCH or PUSCH). Of course, a slot may contain all DL, all UL, or at least one DL portion and at least one UL portion. The simple structure illustrated in FIG. 4 is merely exemplary in nature, and different slot structures may be utilized, and may include one or more of each of the control region(s) and data region(s).

Figure 4:
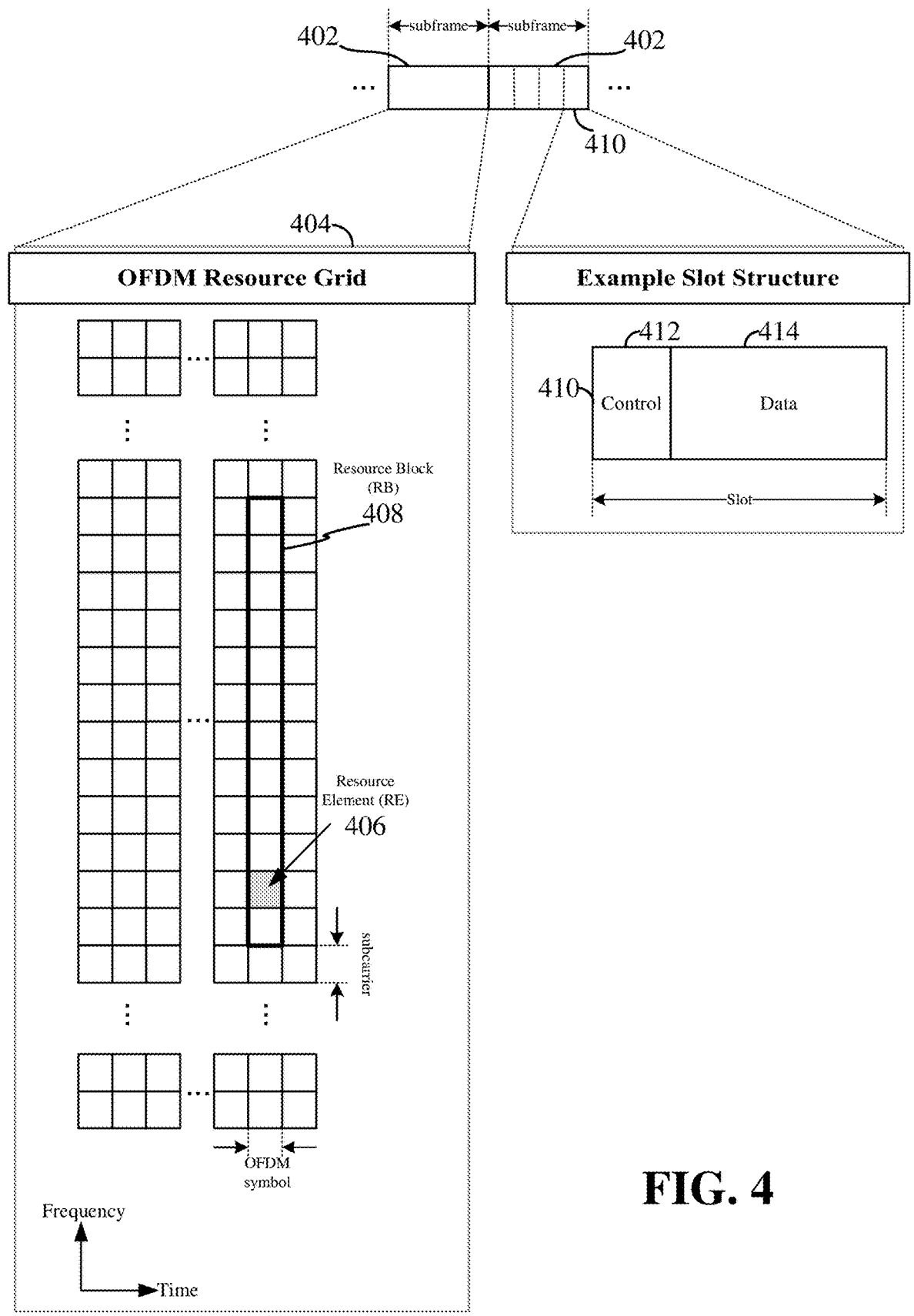
FIG. 4 is a schematic illustration of an organization of wireless resources in an air interface utilizing orthogonal frequency divisional multiplexing (OFDM) according to some embodiments.

Although not illustrated in FIG. 4, the various REs 406 within a RB 408 may be scheduled to carry one or more physical channels, including control channels, shared channels, data channels, etc. Other REs 406 within the RB 408 may also carry pilots or reference signals, including but not limited to a demodulation reference signal (DMRS) a control reference signal (CRS), or a sounding reference signal (SRS). These pilots or reference signals may provide for a receiving device to perform channel estimation of the corresponding channel, which may enable coherent demodulation/detection of the control and/or data channels within the RB 408.

In a DL transmission, the transmitting device (e.g., the scheduling entity 108) may allocate one or more REs 406 (e.g., within a control region 412) to carry DL control information 114 including one or more DL control channels, such as a PBCH; a PSS; a SSS; a physical control format indicator channel (PCFICH); a physical hybrid automatic repeat request (HARQ) indicator channel (PHICH); and/or a physical downlink control channel (PDCCH), etc., to one or more scheduled entities 106. The PCFICH provides information to assist a receiving device in receiving and decoding the PDCCH. The PDCCH carries downlink control information (DCI) including but not limited to power control commands, scheduling information, a grant, and/or an assignment of REs for DL and UL transmissions. The PHICH carries HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

In an UL transmission, the transmitting device (e.g., the scheduled entity 106) may utilize one or more REs 406 to carry UL control information 118 including one or more UL control channels, such as a physical uplink control channel (PUCCH), to the scheduling entity 108. UL control information may include a variety of packet types and categories, including pilots, reference signals, and information configured to enable or assist in decoding uplink data transmissions. In some examples, the control information 118 may include a scheduling request (SR), e.g., a request for the scheduling entity 108 to schedule uplink transmissions. Here, in response to the SR transmitted on the control channel 118, the scheduling entity 108 may transmit downlink control information 114 that may schedule resources for uplink packet transmissions. UL control information may also include HARQ feedback, channel state feedback (CSF), or any other suitable UL control information.

In addition to control information, one or more REs 406 (e.g., within the data region 414) may be allocated for user data or traffic data. This data traffic may be carried on one or more traffic channels, such as, for a DL transmission, a physical downlink shared channel (PDSCH); or for an UL transmission, a physical uplink shared channel (PUSCH). In some examples, one or more REs 406 within the data region 414 may be configured to carry system information blocks (SIBs), carrying information that may enable access to a given cell.

The channels or carriers described above and illustrated in FIGS. 1 and 4 are not necessarily all the channels or carriers that may be utilized between a scheduling entity 108 and scheduled entities 106, and those of ordinary skill in the art will recognize that other channels or carriers may be utilized in addition to those illustrated, such as other traffic, control, and feedback channels.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

Figure 5:
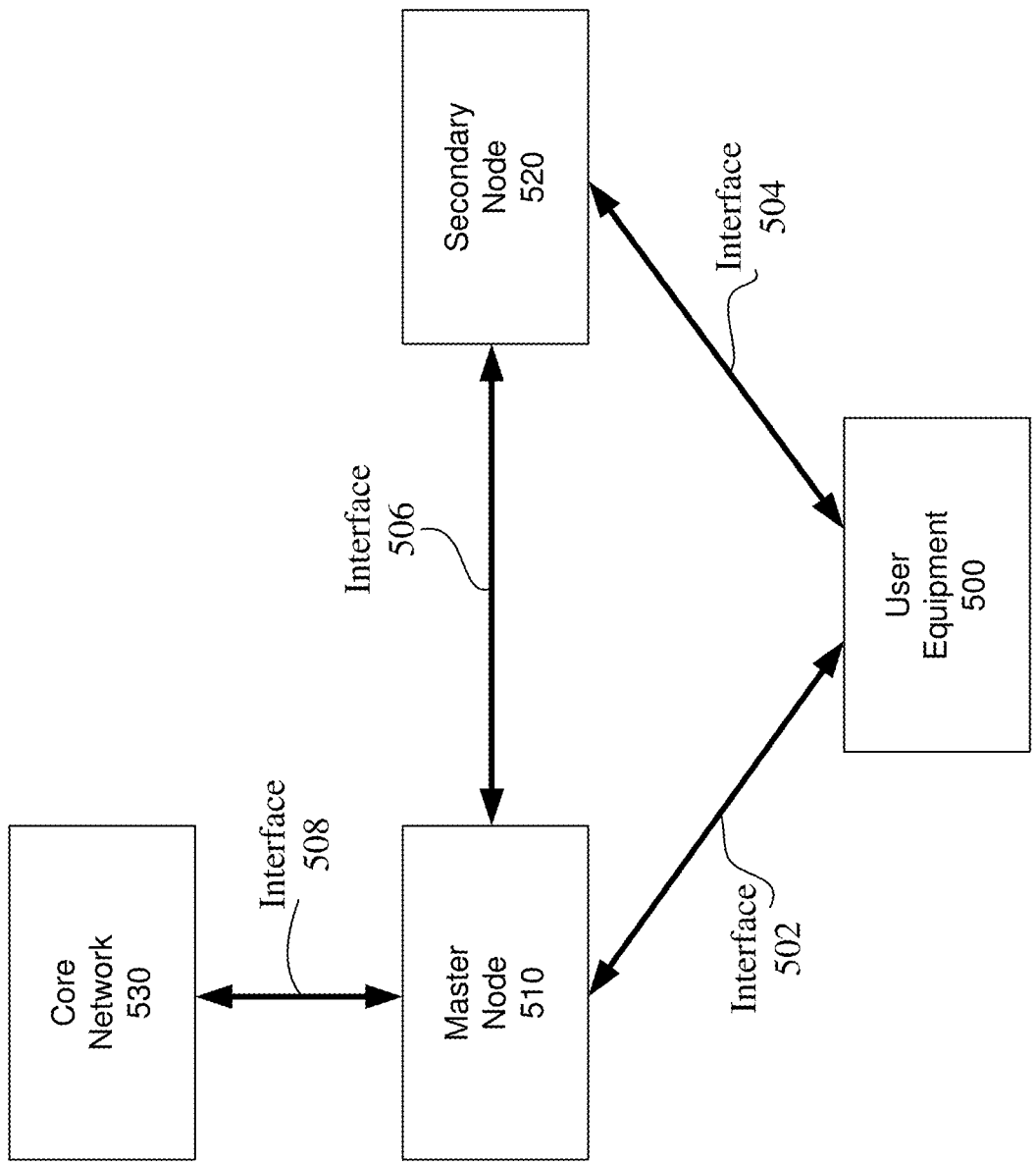
FIG. 5 is a block diagram illustrating an exemplary dual connectivity architecture in accordance with aspects disclosed herein.
Figure 6:
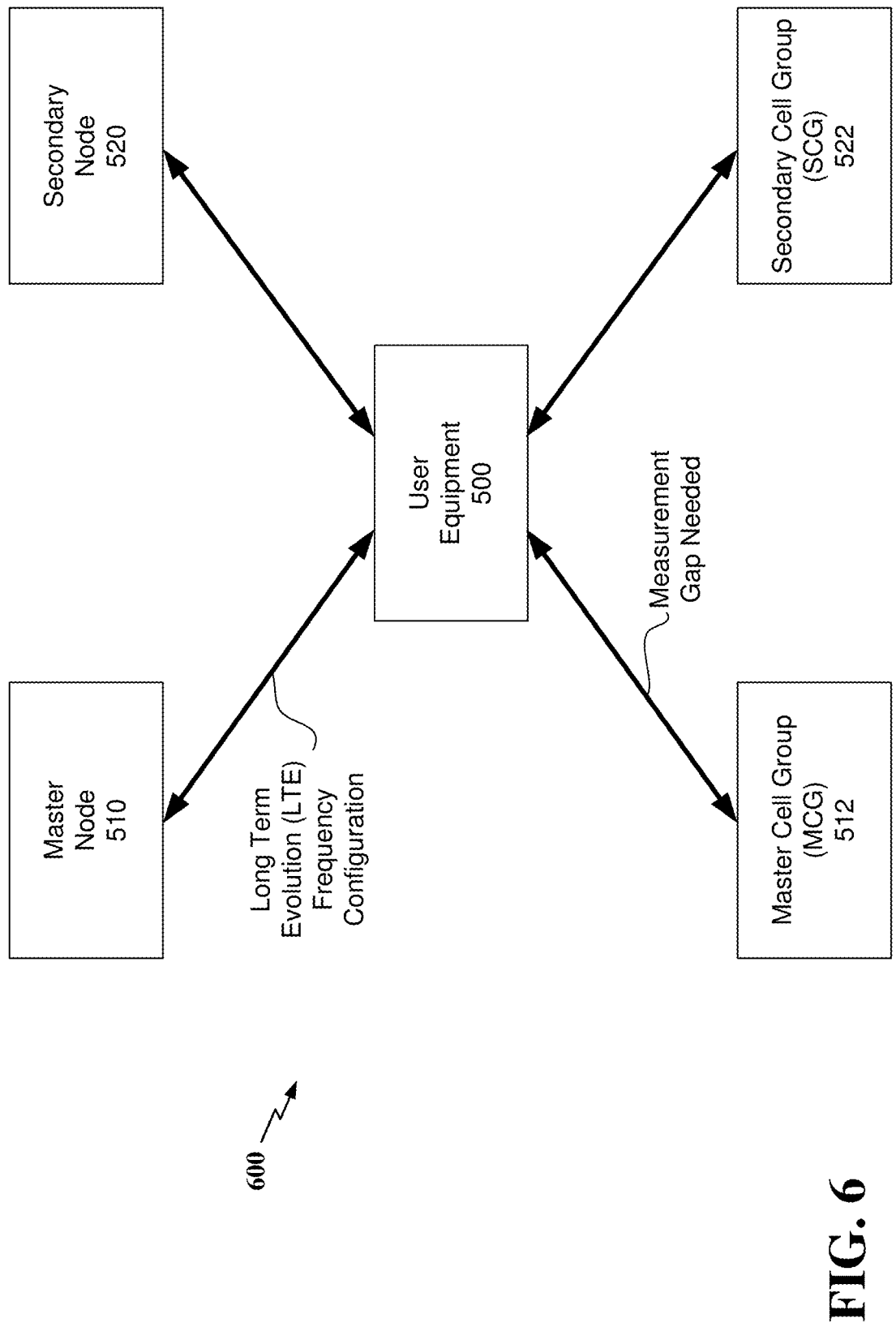
FIG. 6 is a block diagram illustrating a first exemplary dual connectivity measurement scenario in accordance with aspects disclosed herein.
Figure 7:
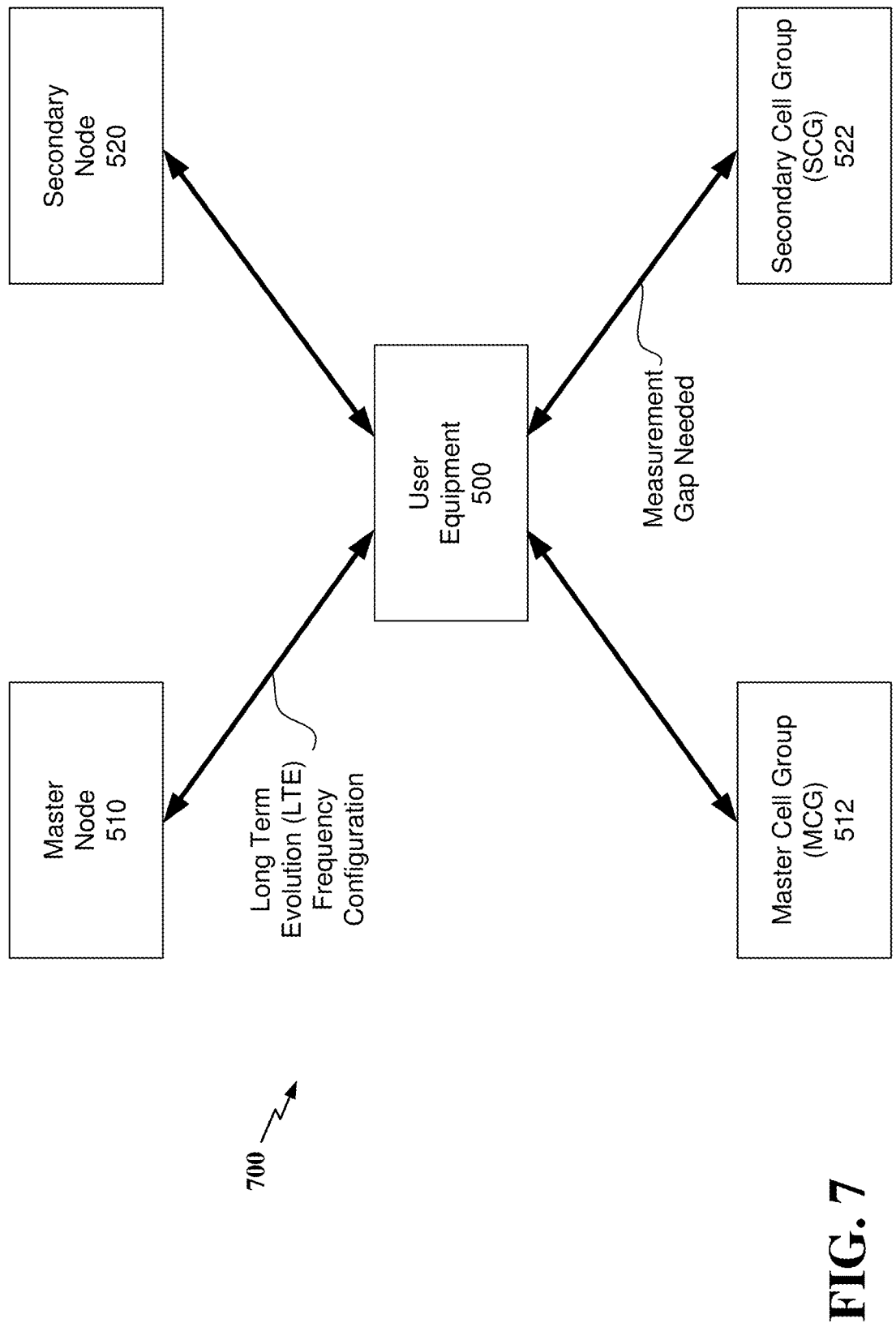
FIG. 7 is a block diagram illustrating a second exemplary dual connectivity measurement scenario in accordance with aspects disclosed herein.
Figure 8:
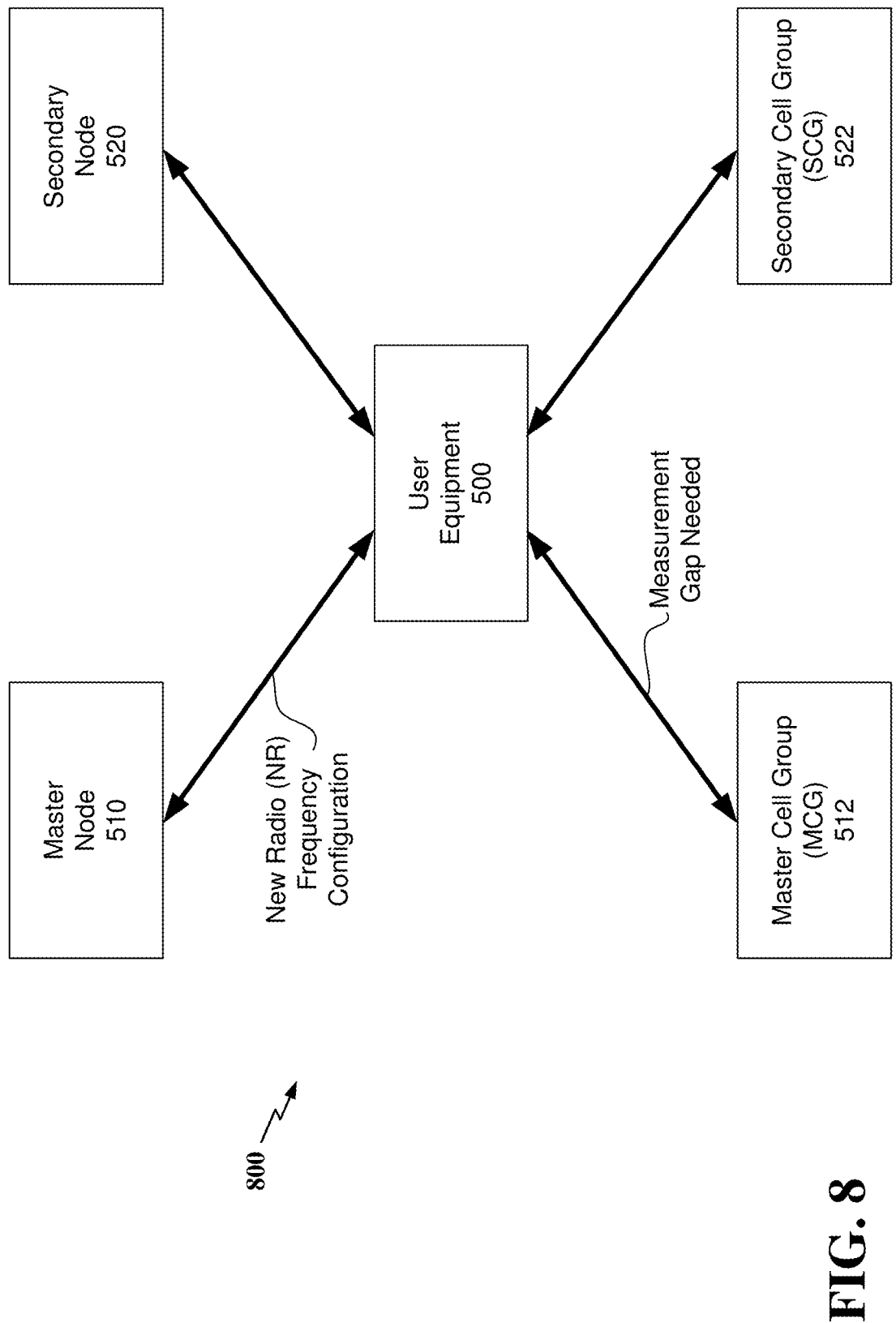
FIG. 8 is a block diagram illustrating a third exemplary dual connectivity measurement scenario in accordance with aspects disclosed herein.
Figure 9:
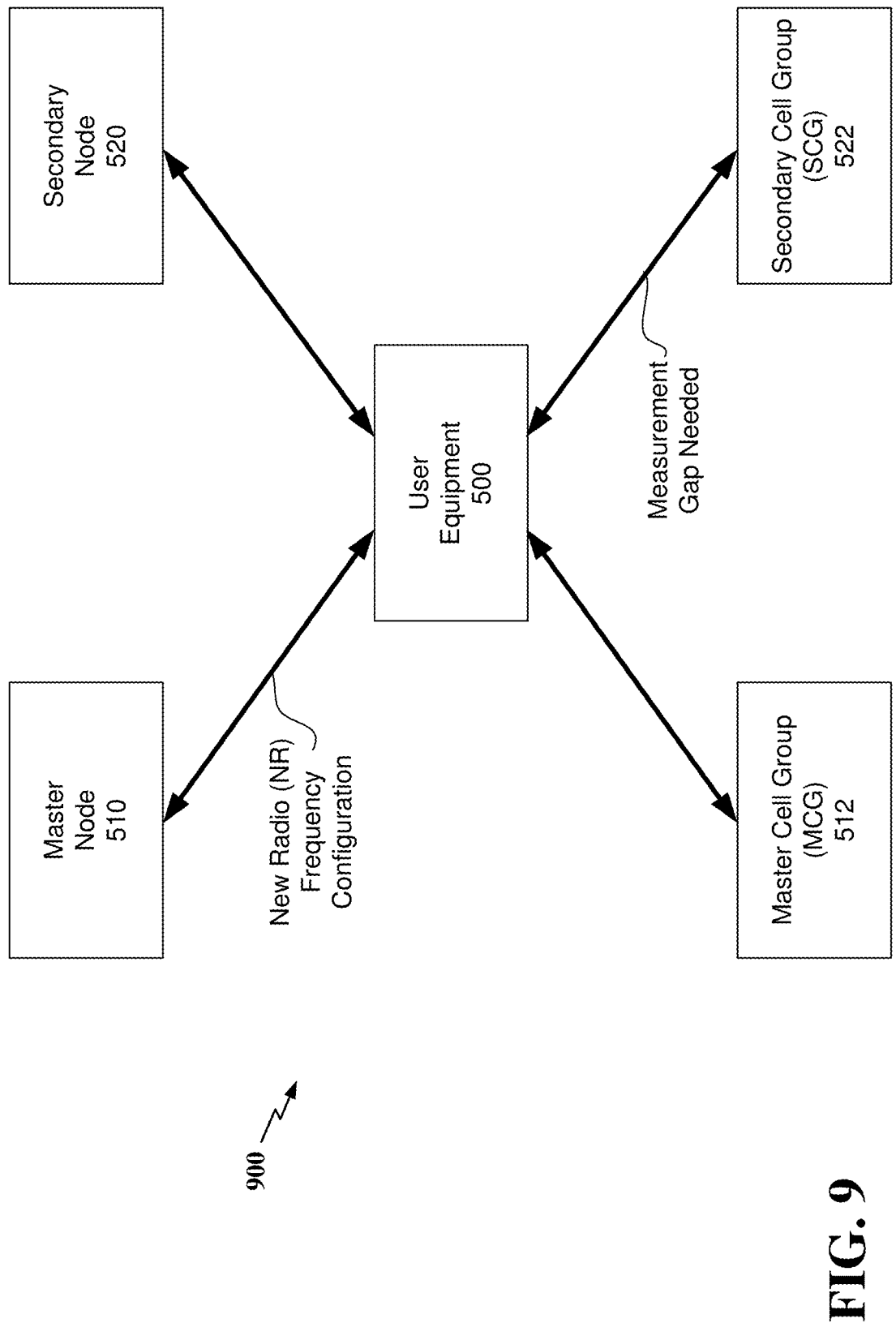
FIG. 9 is a block diagram illustrating a fourth exemplary dual connectivity measurement scenario in accordance with aspects disclosed herein.
Figure 10:
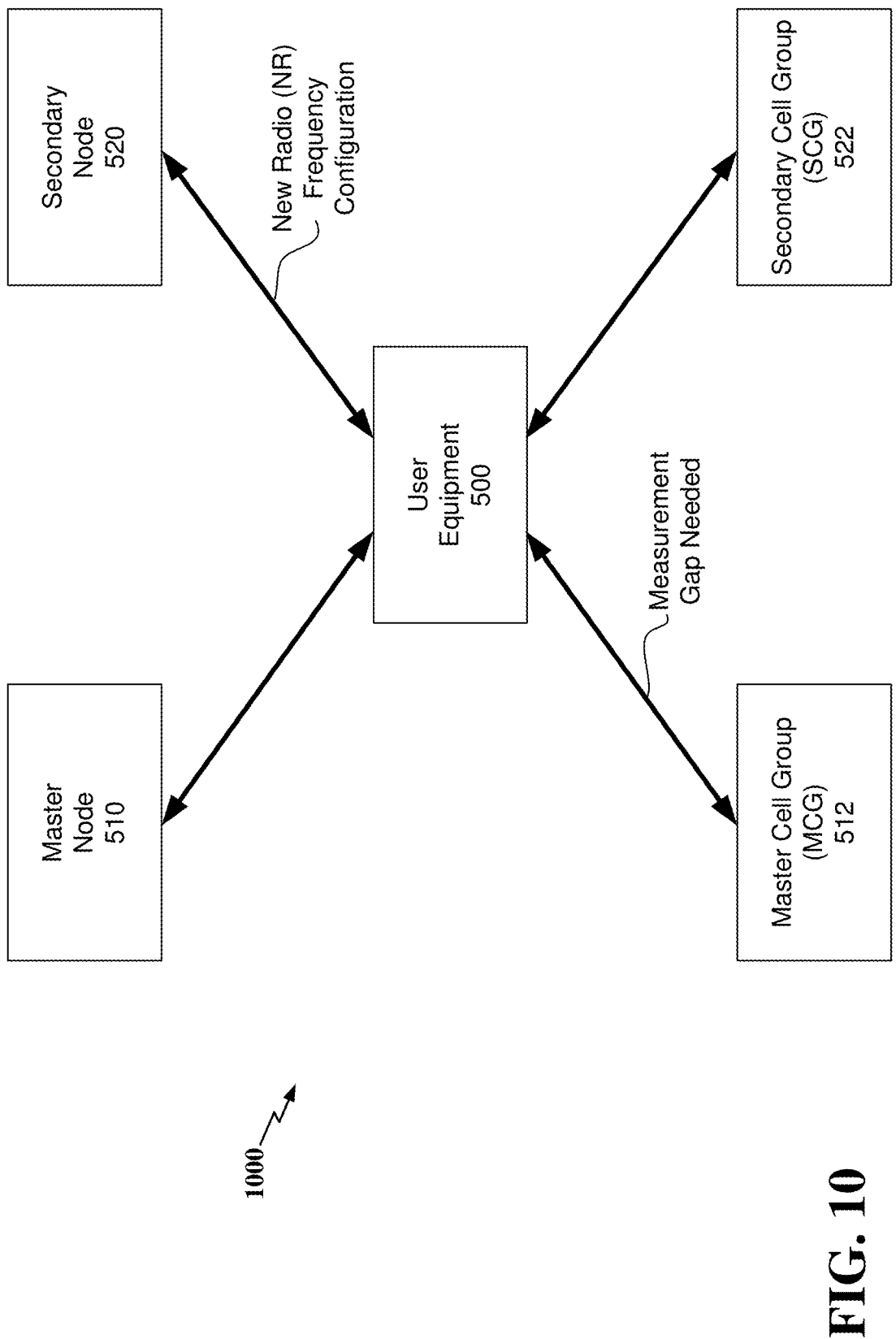
FIG. 10 is a block diagram illustrating a fifth exemplary dual connectivity measurement scenario in accordance with aspects disclosed herein.
Figure 11:
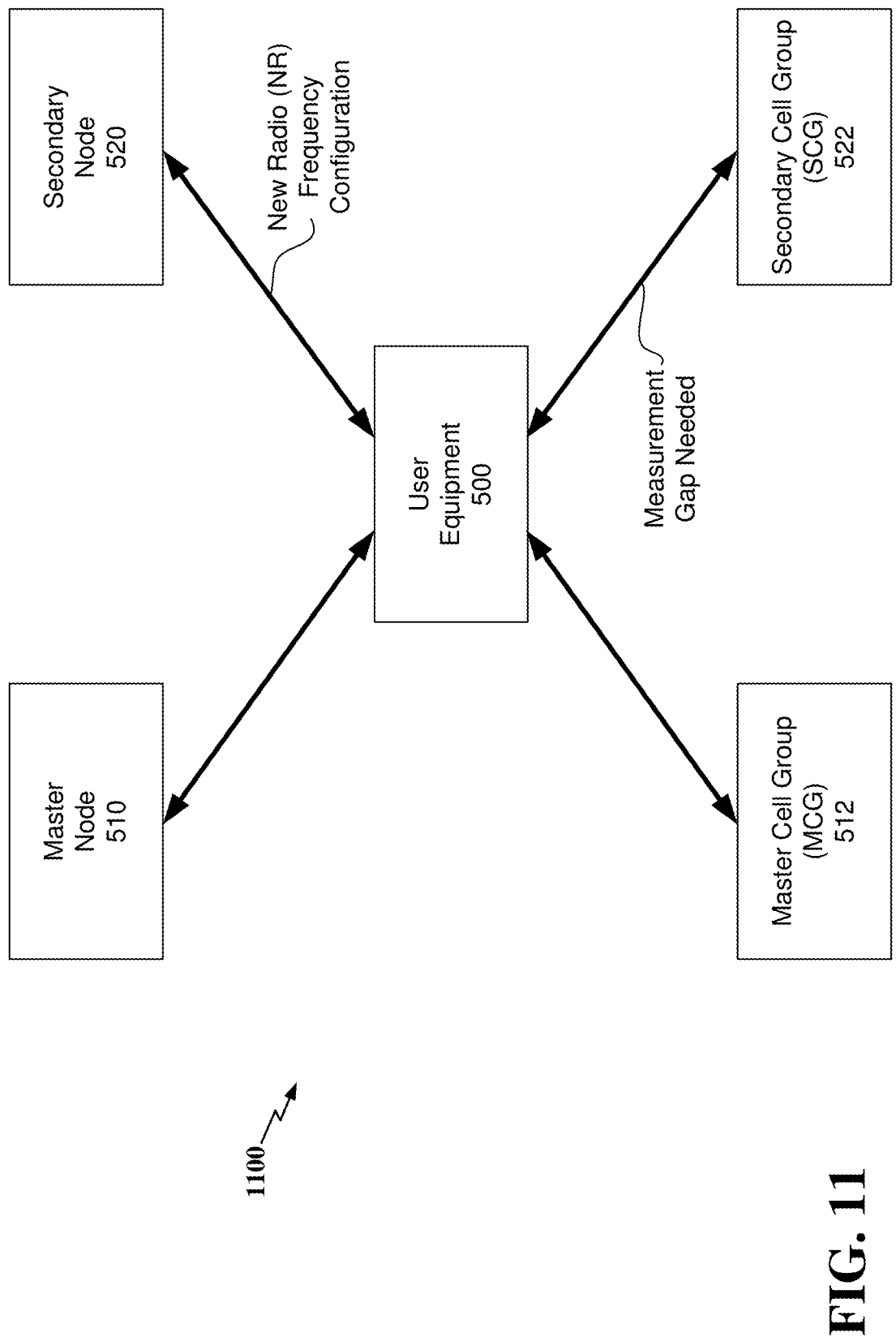
FIG. 11 is a block diagram illustrating a sixth exemplary dual connectivity measurement scenario in accordance with aspects disclosed herein.

As previously stated, aspects disclosed herein are generally directed towards the dual connectivity reporting of a change in a measurement capability of a user equipment (UE). Referring next to FIG. 5, a block diagram illustrating an exemplary dual connectivity architecture is provided. As illustrated, a UE 500 is configured to engage in a dual connectivity communication with a master node 510 via interface 502 (e.g., a wireless interface) and a secondary node 520 via interface 504 (e.g., a wireless interface). Here, if E-UTRA-NR Dual Connectivity (EN-DC) is assumed, the master node 510 may be an eNB (e.g., MeNB) that utilizes a Long Term Evolution (LTE) radio access technology (RAT), whereas the secondary node 520 may be a gNB (e.g., SgNB) that utilizes a 5G New Radio (NR) RAT. It may be further assumed that the master node 510 and the secondary node 520 may be connected to one another via interface 506, as shown, and that the master node 510 may connect to a core network 530 via interface 508, wherein interface 508 connects to the MME (control plane) and to the S-GW (user plane) in the evolved packet core (EPC).

For the architecture illustrated in FIG. 5, if an EN-DC configuration is thus assumed, it should be appreciated that the measurement capability of UE 500 may change when new cell(s) are added to a master cell group (MCG) associated with the master node 510 or to a secondary cell group (SCG) associated with the secondary node 520. For example, to measure a frequency, the UE 500 may change its measurement capability from "gapless" to "need gap" after the cell addition. Although in Rel-14 such measurement capability change can be reported to the master node 510 (e.g., a eNB), some aspects disclosed herein are directed towards the EN-DC case where configuration from one cell group causes a measurement capability change of another cell group. Namely, in EN-DC, it is possible that one or more MCG carriers and one or more SCG carriers share the same radio frequency (RF) path such that when the MCG carrier opens a gap to measure another frequency, the SCG carrier loses its downlink (DL) and hence also needs a gap. For instance, this use case can occur for the band combination of LTE bands and NR sub-6 bands (e.g., for LTE band 25 and NR sub-6 band 41). This scenario can also occur in legacy LTE DC where both the master node and the secondary node are eNBs. In LTE DC, all measurements are configured and managed by the master node, so the master node could use the UE capability to configure measurement gaps on both the MCG and the SCG. However, in EN-DC, the secondary node 520 may separately control its measurement within the SCG and may not be aware that such measurement would cause a gap on the MCG. Therefore, if the master node 510 and the secondary node 520 do not coordinate together, inefficient gaps would be opened separately on MCG and SCG such that throughput degradation is observed by the UE 500, and the UE 500 will become out of sync with the network, if the MCG carrier and the SCG carrier share the same RF path.

A particular EN-DC use case is now discussed. Here, it is first assumed that the UE 500 is communicatively coupled to an MCG LTE cell associated with master node 510 on frequency f1, and communicatively coupled to an SCG NR cell associated with secondary node 520 on frequency f2. It is then assumed that both the master node 510 and the secondary node 520 have configured the UE 500 to measure an NR frequency f4. Assuming that the UE 500 has an additional RF chain, neither of the LTE cell or the NR cell would need a measurement gap to measure frequency f4. Then, we shall assume that the secondary node 520 reconfigures the UE 500 to add a new NR SCG cell on frequency f3. In such scenario, however, the RF chain that was measuring f4 may be occupied by the newly added NR cell on f3. As a result, each of the LTE cell, the NR cell, and the newly added NR cell would require a measurement gap to measure frequency f4 (i.e., the UE has a change in measurement capability).

Since there is no existing mechanism to report the aforementioned change measurement capability to the master node 510 and the secondary node 520, various mechanisms are disclosed herein. To this end, it is first generally noted that a reconfiguration may change the measurement capability of UE 500. And second, although in Rel-14, UE 500 can use the RRCConnectionReconfigurationComplete message to report a measurement capability change to the master node 510 (e.g., a eNB), there is no such mechanism in EN-DC to report a measurement capability change to both the master node 510 (e.g., a eNB) and the secondary node 520 (e.g., a gNB). To address this problem, it is thus contemplated that, after one network node (e.g. master node 510 or secondary node 520) reconfigures the UE 500, a new mechanism should be introduced, which allows the UE to notify any change of per-component carrier (per-CC) gap indication to the other network node (i.e., secondary node 520 or master node 510)

It should be further noted that, in Rel-14, a per-CC gap indication is sent in the RRCConnectionReconfigurationComplete message. In EN-DC, however, since the non-configuring network node does not send a reconfiguration message, this message cannot be used. Therefore, it is contemplated that another message be used to report measurement capability change to the non-configuring node (e.g., UECapabilityInformation message).

Referring next to FIGS. 6-11, block diagrams are provided illustrating various exemplary EN-DC measurement scenarios in accordance with aspects disclosed herein. Here, it should be appreciated that each of the illustrated measurement scenarios 600, 700, 800, 900, 1000, 1100 can occur separately or together. In measurement scenario 600, for example, an LTE frequency measurement is configured by master node 510 and requires a measurement gap in MCG carrier(s) 512. For such scenario 600, it should be noted that no inter-node coordination is required between master node 510 and secondary node 520 since legacy LTE mechanisms may suffice. In measurement scenario 700, however, since the LTE frequency measurement configured by master node 510 requires a measurement gap in SCG carrier(s) 522, inter-node coordination is needed.

With respect to measurement scenarios 800, 900, 1000, and 1100, it should be noted that each scenario assumes that an NR frequency measurement is configured. For instance, with respect to measurement scenario 800, an NR frequency measurement is configured by master node 510, which requires a measurement gap in MCG carrier(s) 512. For such scenario 800, it should be noted that an inter-node coordination is needed between master node 510 and secondary node 520. Similarly, an inter-node coordination is needed for scenario 900 where an NR frequency measurement is configured by master node 510, which requires a measurement gap in SCG carrier(s) 522. Scenario 1000 also needs inter-node coordination since an NR frequency measurement is configured by secondary node 520, which requires a measurement gap in MCG carrier(s) 512. In scenario 1100, however, no inter-node coordination is needed since an NR frequency measurement is configured by secondary node 520, which requires measurement gap in SCG carrier(s) 522.

Here, if either of measurement scenarios 700, 800, 900, and/or 1000 occur separately, either of the aforementioned proposals can be used to report a gap or gapless measurement capability, wherein the master node 510 or secondary node 520 can then configure a corresponding measurement gap accordingly. For instance, coordination amongst the nodes may simply comprise having the master node 510 pass an LTE gap pattern/requirement to the secondary node 520 for measurement scenario 700, or having the secondary node 520 pass an NR gap pattern/requirement to the master node 510 for measurement scenario 1000. It is thus contemplated that, to measure a frequency where the UE 500 only needs a measurement gap on one of MCG or SCG carriers, the UE 500 shall report a "need gap" communication to the corresponding network node (i.e., master node 510, if a gap is needed in MCG; or a secondary node 520, if a gap is needed in SCG). In addition to having the UE 500 report a "need gap" communication, it is further contempated that the UE 500 may be able to report the measurement type and/or request a measurement gap pattern.

However, it's possible that these use cases happen together. For example, when measuring an NR frequency, both an MCG carrier and an SCG carrier may need a measurement gap, wherein it would be desirable to coordinate the gaps on MCG and SCG so that they are aligned (NOTE: this is similar to the LTE-DC measurement gap requirement such that both MCG and SCG gaps use the MCG timeline as time reference).

Figure 12:
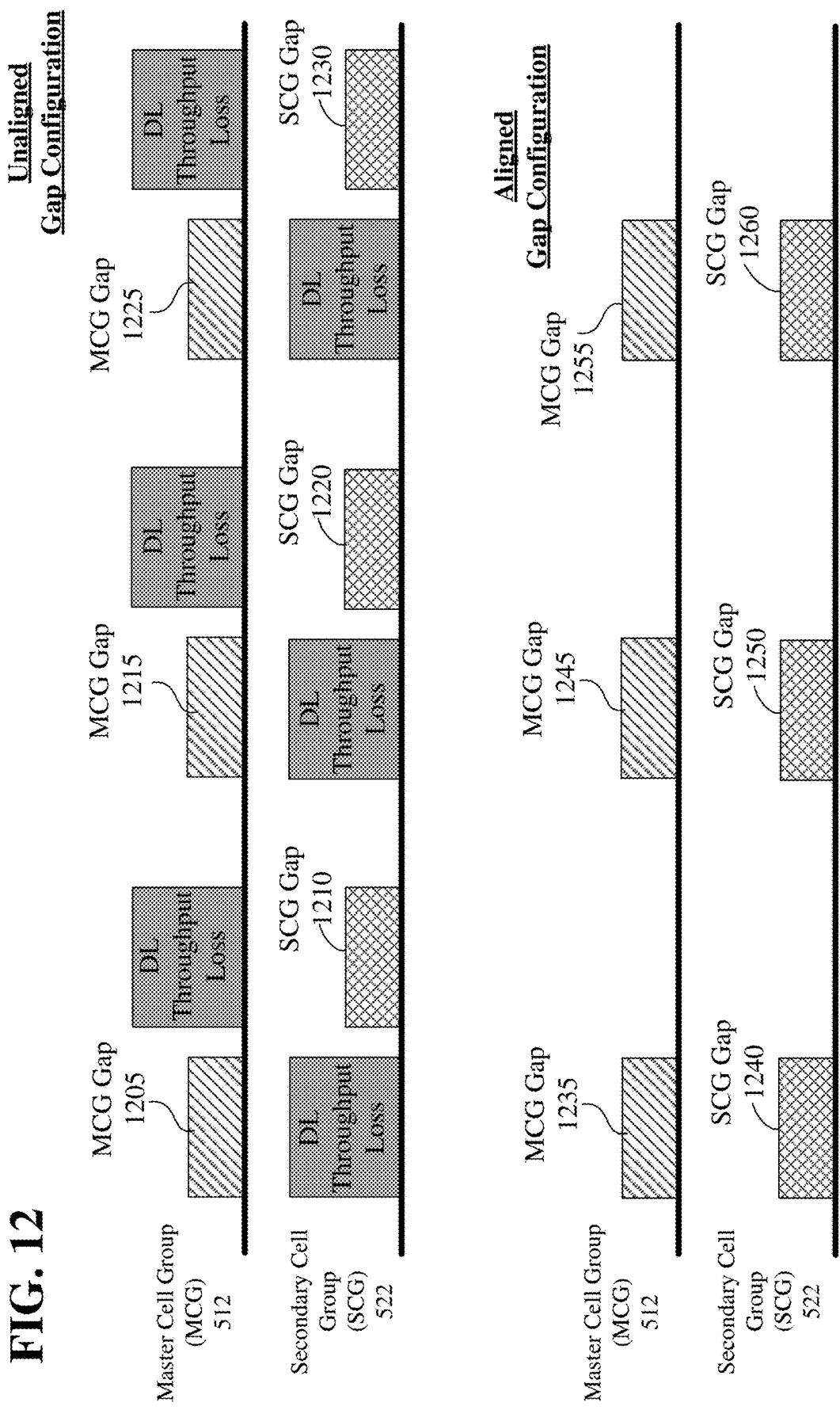
FIG. 12 illustrates a first diagram of an unaligned measurement gap configuration compared with a second diagram of an aligned measurement gap configuration in accordance with aspects disclosed herein.

Referring next to FIG. 12, a first diagram of an unaligned measurement gap configuration is compared with a second diagram of an aligned measurement gap configuration in accordance with aspects disclosed herein. As illustrated, the unaligned gap configuration comprises MCG Gaps 1205, 1215, and 1225, as well as SCG Gaps 1210, 1220, and 1230. Here, because the MCG Gaps 1205, 1215, and 1225 are not aligned with the SCG Gaps 1210, 1220, and 1230, a significant penalty/loss of downlink throughput is observed. To address this, a gap alignment as illustrated in FIG. 12 is contemplated where the MCG Gaps 1235, 1245, and 1255 are respectively aligned with the SCG Gaps 1240, 1250, and 1260.

With respect to coordinating gap alignment, it is proposed herein that the master node 510 shall handle gap coordination between the master node 510 and the secondary node 520. To this end, it is further proposed that, if the UE 500 needs a measurement gap on both MCG and SCG carriers to measure a frequency, the UE 500 shall report "need gap" to the network node responsible for measurement gap coordination between the master node 510 and the secondary node 520 (e.g., the master node 510).

Figure 13:
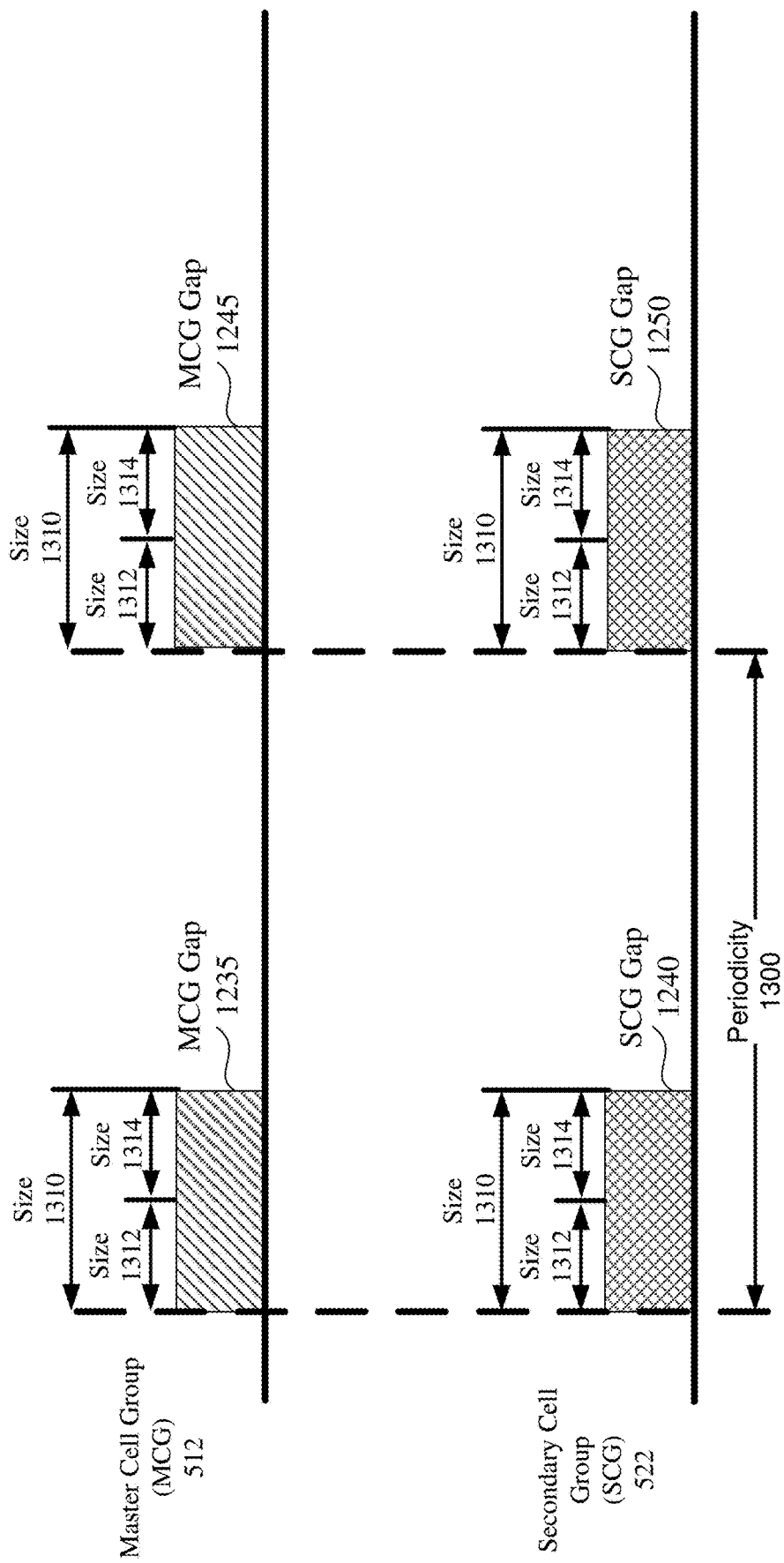
FIG. 13 illustrates exemplary conditions of an aligned measurement gap configuration in accordance with aspects disclosed herein.

It should be noted that, when the UE 500 only needs a measurement gap on one carrier group, in theory the corresponding network node can make a separate decision on how to open the gap. For example, the secondary node 520 may decide to open a gap to measure an NR frequency based on its own interest. In this case, the measurement gap on SCG and the gap on MCG are not necessarily aligned. Therefore, when a measurement gap is needed on both MCG and SCG carriers, particular conditions contemplated herein may be desired. An example of such conditions is provided in FIG. 13 in accordance with an aligned measurement gap configuration disclosed herein. First, it is contemplated that both the MCG measurement gaps 1235, 1245 and the SCG measurement gaps 1240, 1250 may be time-referenced to the same timeline (e.g. the MCG timeline). Second, it is contemplated that both the MCG measurement gaps 1235, 1245 and the SCG measurement gaps 1240, 1250 shall use the same periodicity 1300. And third, as illustrated, it is contemplated that the gap size 1310 of the MCG measurement gaps 1235, 1245 and the SCG measurement gaps 1240, 1250 should be the same and equal to the union of a gap size 1312 associated with the master node RAT (e.g., an LTE gap size) and a gap size 1314 associated with the secondary node RAT (e.g., an NR gap size).

Exemplary Scheduling Entity

Figure 14:
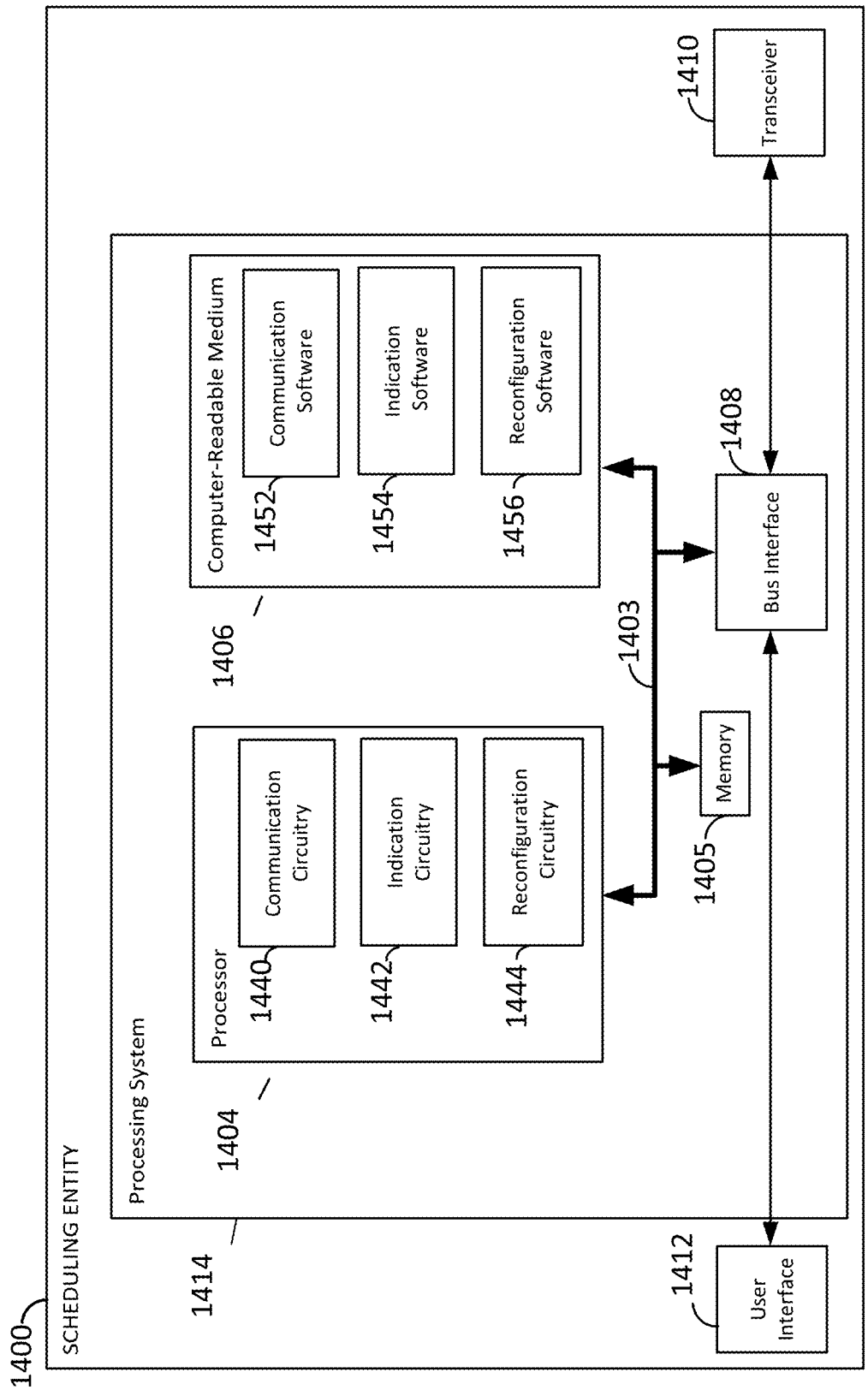
FIG. 14 is a block diagram illustrating an example of a hardware implementation for a scheduling entity employing a processing system in accordance with aspects disclosed herein.

FIG. 14 is a block diagram illustrating an example of a hardware implementation for a scheduling entity 1400 employing a processing system 1414. For example, the scheduling entity 1400 may be a user equipment (UE) as illustrated in any one or more of the FIGs. disclosed herein. In another example, the scheduling entity 1400 may be a base station as also illustrated in any one or more of the FIGs. disclosed herein.

The scheduling entity 1400 may be implemented with a processing system 1414 that includes one or more processors 1404. Examples of processors 1404 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 1400 may be configured to perform any one or more of the functions described herein. That is, the processor 1404, as utilized in a scheduling entity 1400, may be used to implement any one or more of the processes and procedures described below and illustrated in FIG. 15.

In this example, the processing system 1414 may be implemented with a bus architecture, represented generally by the bus 1402. The bus 1402 may include any number of interconnecting buses and bridges depending on the specific application of the processing system 1414 and the overall design constraints. The bus 1402 communicatively couples together various circuits including one or more processors (represented generally by the processor 1404), a memory 1405, and computer-readable media (represented generally by the computer-readable medium 1406). The bus 1402 may also link various other circuits such as timing sources, peripherals, voltage regulators, and power management circuits, which are well known in the art, and therefore, will not be described any further. A bus interface 1408 provides an interface between the bus 1402 and a transceiver 1410. The transceiver 1410 provides a communication interface or means for communicating with various other apparatus over a transmission medium. Depending upon the nature of the apparatus, a user interface 1412 (e.g., keypad, display, speaker, microphone, joystick) may also be provided.

In some aspects of the disclosure, the processor 1404 may include a communication circuitry 1440 configured for various functions, including, for example, to establish a communication with a scheduled entity (e.g., scheduled entity 1600) in which the communication is one of a first communication or a second communication of a dual connectivity communication with the scheduled entity (e.g., scheduled entity 1600). Here, it is contemplated that the first communication is a communication with the scheduled entity (e.g., scheduled entity 1600) according to a first radio access technology (RAT) when the scheduling entity 1400 operates as a master node, and the second communication is a communication with the scheduled entity (e.g., scheduled entity 1600) according to a second RAT when the scheduling entity 1400 operates as a secondary node. As illustrated, the processor 1404 may also include an indication circuitry 1442 configured for various functions. For instance, the indication circuitry 1442 may be configured to receive an indication from the scheduled entity (e.g., scheduled entity 1600) of a change in measurement capability associated with at least one of the first communication or the second communication. The processor 1404 may further include reconfiguration circuitry 1444 configured for various functions, including, for example, to reconfigure at least one of the first communication or the second communication in response to the change in measurement capability. To this end, it should be appreciated that, the combination of the communication circuitry 1440, the indication circuitry 1442, and the reconfiguration circuitry 1444 may be configured to implement one or more of the functions described herein.

Various other aspects for scheduling entity 1400 are also contemplated. For instance, the communication circuitry 1440 may be configured such that the first RAT associated with the first communication is a Long-Term Evolution (LTE) RAT, and the second RAT associated with the second communication is a New Radio (NR) RAT. As previously mentioned, it is also contemplated that a scheduled entity (e.g., scheduled entity 1600) may communicate a change in measurement capability to a network via a radio resource control (RRC) message, and a UE capability information message. Accordingly, it is further contemplated that the indication circuitry 1442 may be configured to receive the indication of the change in measurement capability via at least one of an RRC message or a UE capability information message.

In another aspect of the disclosure, embodiments are contemplated for when the scheduled entity (e.g., scheduled entity 1600) requires a single measurement gap configuration. For instance, it is contemplated that the indication received from the scheduled entity (e.g., scheduled entity 1600) includes an indication of a desire for a measurement gap to facilitate a measurement on one of a carrier associated with a master cell group (MCG) or a carrier associated with a secondary cell group (SCG). In a particular aspect of the disclosure, the indication circuitry 1442 may be configured to receive the indication of the desire for the measurement gap when the scheduling entity 1400 operates as the master node if the measurement gap facilitates an MCG carrier measurement. Similarly, the indication circuitry 1442 may be configured to receive the indication of the desire for the measurement gap when the scheduling entity 1400 operates as the secondary node if the measurement gap facilitates an SCG carrier measurement. In a further aspect of the disclosure, it is contemplated that the communication circuitry 1440 may be configured to communicate information associated with the indication of the desire for the measurement gap to a different scheduling entity, wherein the scheduling entity 1400 is one of the master node or the secondary node, and wherein the different scheduling entity is an opposite one of the master node or the secondary node. For instance, such communication may include a gap pattern associated with a corresponding measurement gap configuration (e.g., the master node communicating a gap pattern to the secondary node, or the secondary node communicating a gap pattern to the master node).

In yet another aspect of the disclosure, embodiments are contemplated for when the scheduled entity requires two measurement gap configurations. Namely, it is contemplated that the indication received from the scheduled entity (e.g., scheduled entity 1600) may include an indication of a desire for both a first measurement gap to facilitate a first measurement on a first carrier associated with an MCG, as well as an indication of a desire for a second measurement gap to facilitate a second measurement on a second carrier associated with an SCG. For this implementation, the indication circuitry 1442 may be configured to receive the indication of the change in measurement capability when the scheduling entity 1400 is the master node. The reconfiguration circuitry may then be configured to coordinate a gap alignment of the first measurement gap and the second measurement gap with the secondary node when the scheduling entity is the master node. Such coordination may, for example, include aligning the first measurement gap and the second measurement gap according to a common timing reference (e.g., a timing reference associated with the MCG; configuring the first measurement gap and the second measurement gap to have a same periodicity; and selecting the first measurement gap and the second measurement gap to have a same size, wherein the same size is a union of a first gap size associated with the first RAT (e.g., an LTE gap size) and a second gap size associated with the second RAT (e.g., an NR gap size).

Referring back to the remaining components of scheduling entity 1400, it should be appreciated that the processor 1404 is responsible for managing the bus 1402 and general processing, including the execution of software stored on the computer-readable medium 1406. The software, when executed by the processor 1404, causes the processing system 1414 to perform the various functions described below for any particular apparatus. The computer-readable medium 1406 and the memory 1405 may also be used for storing data that is manipulated by the processor 1404 when executing software.

One or more processors 1404 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1406. The computer-readable medium 1406 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 1406 may reside in the processing system 1414, external to the processing system 1414, or distributed across multiple entities including the processing system 1414. The computer-readable medium 1406 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 1406 may include communication software 1452 configured for various functions, including, for example, to establish a communication with a scheduled entity (e.g., scheduled entity 1600) in which the communication is one of a first communication or a second communication of a dual connectivity communication with the scheduled entity (e.g., scheduled entity 1600). Here, it is contemplated that the first communication is a communication with the scheduled entity (e.g., scheduled entity 1600) according to a first RAT when the scheduling entity 1400 operates as a master node, and the second communication is a communication with the scheduled entity (e.g., scheduled entity 1600) according to a second RAT when the scheduling entity 1400 operates as a secondary node. As illustrated, the computer-readable storage medium 1406 may also include indication software 1454 configured for various functions. For instance, the indication software 1454 may be configured to receive an indication from the scheduled entity (e.g., scheduled entity 1600) of a change in measurement capability associated with at least one of the first communication or the second communication. The computer-readable storage medium 1406 may further include reconfiguration software 1456 configured for various functions, including, for example, to reconfigure at least one of the first communication or the second communication in response to the change in measurement capability.

In a particular configuration, it is also contemplated that the scheduling entity 1400 includes means for establishing a communication with a scheduled entity (e.g., scheduled entity 1600), means for receiving an indication from the scheduled entity (e.g., scheduled entity 1600) of a change in measurement capability, and means for reconfiguring the communication in response to the change in measurement capability. In one aspect, the aforementioned means may be the processor(s) 1404 configured to perform the functions recited by the aforementioned means. In another aspect, the aforementioned means may be a circuit or any apparatus configured to perform the functions recited by the aforementioned means.

Figure 15:
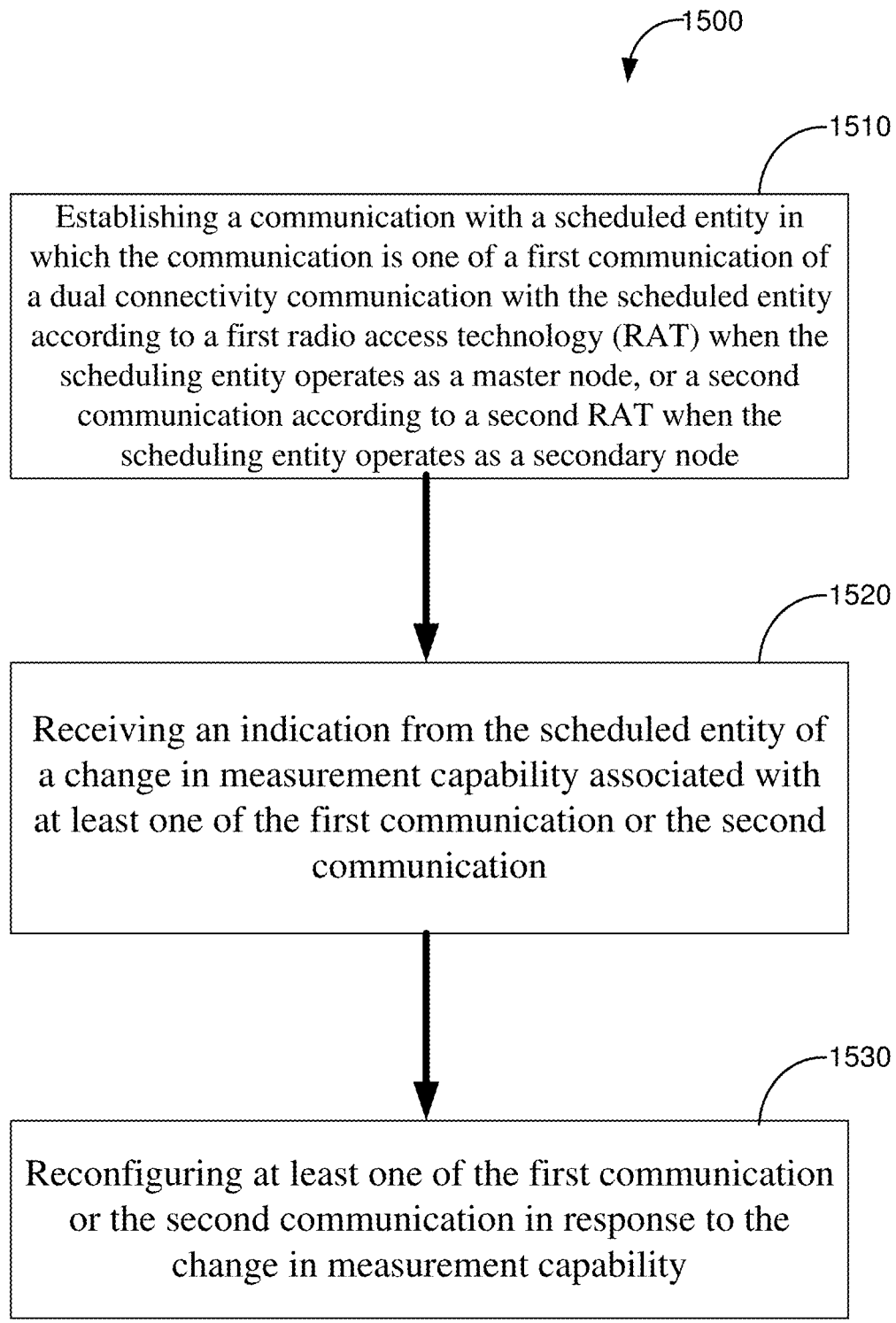
FIG. 15 is a flow chart illustrating an exemplary scheduling entity process that facilitates receiving a dual connectivity reporting of a change in user equipment (UE) measurement capability according to some aspects of the disclosure.

Of course, in the above examples, the circuitry included in the processor 1404 is merely provided as an example, and other means for carrying out the described functions may be included within various aspects of the present disclosure, including but not limited to the instructions stored in the computer-readable storage medium 1406, or any other suitable apparatus or means described herein and utilizing, for example, the processes and/or algorithms described in relation to FIG. 15.

In FIG. 15, a flow chart is provided, which illustrates an exemplary scheduling entity process that facilitates receiving a dual connectivity reporting of a change in UE measurement capability according to some aspects of the disclosure. As described below, some or all illustrated features may be omitted in a particular implementation within the scope of the present disclosure, and some illustrated features may not be required for implementation of all embodiments. In some examples, the process 1500 may be carried out by the scheduling entity 1400 illustrated in FIG. 14. In some examples, the process 1500 may be carried out by any suitable apparatus or means for carrying out the functions or algorithm described below.

Process 1500 begins at block 1510 with the establishing of a communication with a scheduled entity (e.g., scheduled entity 1600). Here, it is contemplated that such communication is one of a first communication of a dual connectivity communication with the scheduled entity (e.g., scheduled entity 1600) according to a first RAT (e.g., LTE) when the scheduling entity 1400 operates as a master node, or a second communication according to a second RAT (e.g., NR) when the scheduling entity 1400 operates as a secondary node. Once a communication is established at block 1510, process 1500 proceeds to block 1520 where the scheduling entity 1400 receives an indication from the scheduled entity (e.g., scheduled entity 1600) of a change in measurement capability associated with at least one of the first communication or the second communication. Process 1500 then concludes at block 1530 where the scheduling entity 1400 reconfigures at least one of the first communication or the second communication in response to the change in measurement capability.

Exemplary Scheduled Entity

Figure 16:
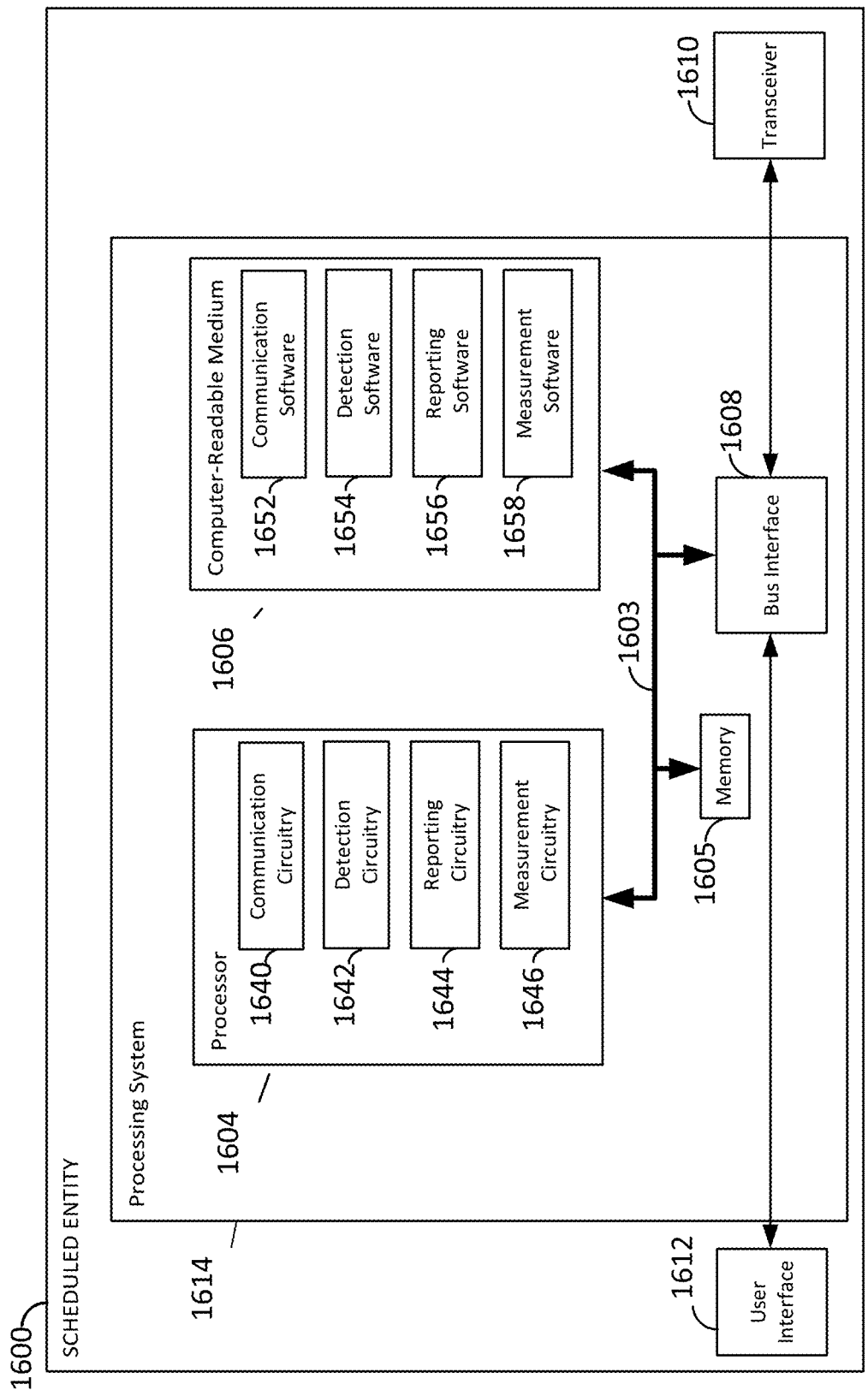
FIG. 16 is a block diagram illustrating an example of a hardware implementation for a scheduled entity employing a processing system in accordance with aspects disclosed herein.

FIG. 16 is a conceptual diagram illustrating an example of a hardware implementation for an exemplary scheduled entity 1600 employing a processing system 1614. In accordance with various aspects of the disclosure, an element, or any portion of an element, or any combination of elements may be implemented with a processing system 1614 that includes one or more processors 1604. For example, the scheduled entity 1600 may be a user equipment (UE) as illustrated in any one or more of the FIGs. disclosed herein.

The processing system 1614 may be substantially the same as the processing system 1414 illustrated in FIG. 14, including a bus interface 1608, a bus 1602, memory 1605, a processor 1604, and a computer-readable medium 1606. Furthermore, the scheduled entity 1600 may include a user interface 1612 and a transceiver 1610 substantially similar to those described above in FIG. 14. That is, the processor 1604, as utilized in a scheduled entity 1600, may be used to implement any one or more of the processes described below and illustrated in the various figures.

In some aspects of the disclosure, the processor 1604 may include a communication circuitry 1640 configured for various functions, including, for example, to establish a dual connectivity communication with a network, which includes a first communication with a master node according to a first radio access technology (RAT), and a second communication with a secondary node according to a second RAT. As illustrated, the processor 1604 may also include detection circuitry 1642 configured for various functions. For instance, detection circuitry 1642 may be configured to detect a change in measurement capability associated with at least one of the first communication with the master node or the second communication with the secondary node. The processor 1604 may further include reporting circuitry 1644 configured for various functions, including, for example, to report the change in measurement capability to at least one of the master node or the secondary node. For some embodiments, the processor may also include a measurement circuitry 1646 configured to perform various measurements in accordance with aspects disclosed herein. To this end, it should be appreciated that, the combination of the communication circuitry 1640, the detection circuitry 1642, the reporting circuitry 1644, and the measurement circuitry 1646 may be configured to implement one or more of the functions described herein.

Various other aspects for scheduled entity 1600 are also contemplated. For instance, the communication circuitry 1640 may be configured such that the first RAT associated with the first communication is a Long-Term Evolution (LTE) RAT, and the second RAT associated with the second communication is a New Radio (NR) RAT. As previously mentioned, it is also contemplated that a scheduled entity 1600 may communicate a change in measurement capability to a network via a radio resource control (RRC) message, and a user equipment (UE) capability information message. Accordingly, it is further contemplated that the reporting circuitry 1644 may be configured to provide a first reporting of the change in measurement capability via an RRC message, and a second reporting of the change in measurement capability via a UE capability information message.

In another aspect of the disclosure, embodiments are contemplated for when the scheduled entity 1600 requires a single measurement gap configuration. For instance, it is contemplated that the change in measurement capability may indicate a desire for a measurement gap to facilitate a measurement on one of a carrier associated with a master cell group (MCG) or a carrier associated with a secondary cell group (SCG). In such case, the reporting circuitry 1644 may be configured to report the desire for the measurement gap to the master node when the measurement gap facilitates an MCG carrier measurement. Similarly, the reporting circuitry 1644 may be configured to report the desire for the measurement gap to the secondary node when the measurement gap facilitates an SCG carrier measurement.

In yet another aspect of the disclosure, embodiments are contemplated for when the scheduled entity 1600 requires two measurement gap configurations. For instance, it is contemplated that the change in measurement capability may indicate both a desire for a first measurement gap to facilitate a first measurement on a first carrier associated with an MCG, as well as a desire for a second measurement gap to facilitate a second measurement on a second carrier associated with an SCG. In such case, the reporting circuitry 1644 may be configured to report the desire for the first measurement gap and the desire for the second measurement gap to a network node responsible for measurement gap coordination between the master node and the secondary node. The scheduled entity 1600 may then further comprise a measurement circuitry 1646 configured to perform the first measurement during the first measurement gap and the second measurement during the second measurement gap in which: the first measurement gap and the second measurement gap are aligned according to a common timing reference (e.g., a timing reference associated with the MCG); the first measurement gap and the second measurement gap have a same periodicity; and the first measurement gap and the second measurement gap have a same size, wherein the same size is a union of a first gap size associated with the first RAT (e.g., an LTE gap size) and a second gap size associated with the second RAT (e.g., an NR gap size).

Similar to processor 1404, processor 1604 is responsible for managing the bus 1602 and general processing, including the execution of software stored on the computer-readable medium 1606. The software, when executed by the processor 1604, causes the processing system 1614 to perform the various functions described below for any particular apparatus. The computer-readable medium 1606 and the memory 1605 may also be used for storing data that is manipulated by the processor 1604 when executing software.

One or more processors 1604 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1606. Similar to computer-readable medium 1406, computer-readable medium 1606 may be a non-transitory computer-readable medium comprising characteristics that are substantially similar. The computer-readable medium 1606 may reside in the processing system 1614, external to the processing system 1614, or distributed across multiple entities including the processing system 1614. It should also be appreciated that, similar to computer-readable medium 1406, computer-readable medium 1606 may be embodied in a computer program product comprising characteristics that are substantially similar.

In one or more examples, the computer-readable storage medium 1606 may include communication software 1652 configured for various functions, including, for example, to establish a dual connectivity communication with a network, which includes a first communication with a master node according to a first RAT, and a second communication with a secondary node according to a second RAT. As illustrated, the computer-readable medium 1606 may also include detection software 1654 configured for various functions. For instance, detection software 1654 may be configured to detect a change in measurement capability associated with at least one of the first communication with the master node or the second communication with the secondary node. The computer-readable medium 1606 may further include reporting software 1656 configured for various functions, including, for example, to report the change in measurement capability to at least one of the master node or the secondary node. For some embodiments, the computer-readable medium 1606 may further include measurement software 1658 configured to perform various measurements in accordance with aspects disclosed herein. To this end, it should be appreciated that, the combination of the communication software 1652, the detection software 1654, the reporting software 1656, and the measurement software 1658 may be configured to implement one or more of the functions described herein.

In a particular configuration, it is also contemplated that the scheduled entity 1600 includes means for establishing a dual connectivity communication with a network, means for detecting a change in measurement capability, and means for reporting the change in measurement capability. In one aspect, the aforementioned means may be the processor(s) 1604 configured to perform the functions recited by the aforementioned means. In another aspect, the aforementioned means may be a circuit or any apparatus configured to perform the functions recited by the aforementioned means.

Figure 17:
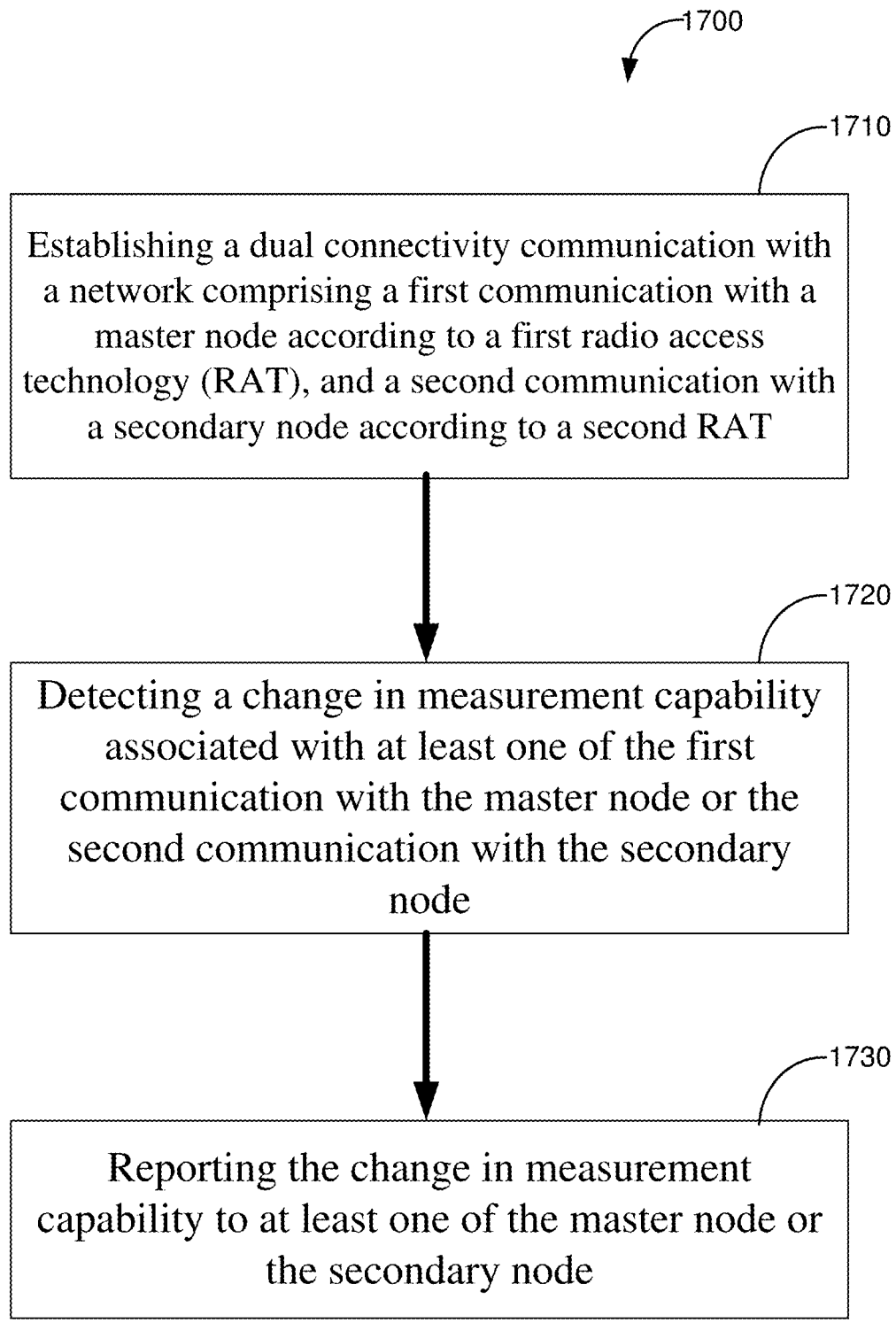
FIG. 17 is a flow chart illustrating an exemplary scheduled entity process that facilitates reporting a change in measurement capability according to some aspects of the disclosure.

Of course, in the above examples, the circuitry included in the processor 1604 is merely provided as an example, and other means for carrying out the described functions may be included within various aspects of the present disclosure, including but not limited to the instructions stored in the computer-readable storage medium 1606, or any other suitable apparatus or means described herein, and utilizing, for example, the processes and/or algorithms described in relation to FIG. 17.

In FIG. 17, a flow chart is provided, which illustrates an exemplary scheduled entity process that facilitates reporting a change in measurement capability according to some aspects of the disclosure. As described below, some or all illustrated features may be omitted in a particular implementation within the scope of the present disclosure, and some illustrated features may not be required for implementation of all embodiments. In some examples, the process 1700 may be carried out by the scheduled entity 1600 illustrated in FIG. 16. In some examples, the process 1700 may be carried out by any suitable apparatus or means for carrying out the functions or algorithm described below.

Process 1700 begins at block 1710 with the establishing of a dual connectivity communication with a network (e.g., scheduling entity 1400). Here, it is contemplated that such a dual connectivity communication may include a first communication with a master node according to a first RAT (e.g., LTE), and a second communication with a secondary node according to a second RAT (e.g., NR). Once a dual connectivity communication is established at block 1710, process 1700 proceeds to block 1720 where the scheduled entity 1600 detects a change in measurement capability associated with at least one of the first communication with the master node or the second communication with the secondary node. Process 1700 then concludes at block 1730 where the change in measurement capability is reported to at least one of the master node or the secondary node.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-17 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-17 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication at a scheduled entity, comprising:

establishing a dual connectivity communication with a network, the dual connectivity communication comprising a first communication with a master node according to a first radio access technology (RAT), and a second communication with a secondary node according to a second RAT;

detecting a change in measurement capability associated with at least one of the first communication with the master node or the second communication with the secondary node, wherein the change in measurement capability corresponds to a change from a gapless measurement capability where no measurement gap is necessary to a gap measurement capability where a measurement gap is desired; and reporting the change in measurement capability to at least one of the master node or the secondary node.

2. The method of claim 1, wherein the first RAT is a Long-Term Evolution (LTE) RAT, and wherein the second RAT is a New Radio (NR) RAT.

3. The method of claim 1, wherein the reporting comprises a first reporting of the change in measurement capability via a radio resource control (RRC) message, and a second reporting of the change in measurement capability via a user equipment (UE) capability information message.

4. The method of claim 1, the reporting of the change in measurement capability indicating a desire for a measurement gap to facilitate a measurement on one of a carrier associated with a master cell group (MCG) or a carrier associated with a secondary cell group (SCG), wherein the reporting comprises reporting the desire for the measurement gap to the master node when the measurement gap facilitates an MCG carrier measurement, and wherein the reporting comprises reporting the desire for the measurement gap to the secondary node when the measurement gap facilitates an SCG carrier measurement.

5. The method of claim 1, the reporting of the change in measurement capability indicating a desire for a first measurement gap to facilitate a first measurement on a first carrier associated with a master cell group (MCG) and a desire for a second measurement gap to facilitate a second measurement on a second carrier associated with a secondary cell group (SCG), wherein the reporting comprises reporting the desire for the first measurement gap and the desire for the second measurement gap to a network node responsible for measurement gap coordination between the master node and the secondary node.

6. The method of claim 5, further comprising performing the first measurement during the first measurement gap and the second measurement during the second measurement gap, wherein:
the first measurement gap and the second measurement gap are aligned according to a common timing reference;
the first measurement gap and the second measurement gap have a same periodicity; and
the first measurement gap and the second measurement gap have a same size, wherein the same size is a union of a first gap size associated with the first RAT and a second gap size associated with the second RAT.

7. An apparatus for wireless communications at a scheduled entity comprising:
a communication circuitry configured to establish a dual connectivity communication with a network, wherein the dual connectivity communication comprises a first communication with a master node according to a first radio access technology (RAT), and a second communication with a secondary node according to a second RAT;
a detection circuitry configured to detect a change in measurement capability associated with at least one of the first communication with the master node or the second communication with the secondary node wherein the change in measurement capability corresponds to a change from a gapless measurement capability where no measurement gap is necessary to a gap measurement capability where a measurement gap is desired; and
a reporting circuitry configured to report the change in measurement capability to at least one of the master node or the secondary node.

8. The apparatus of claim 7, wherein the first RAT is a Long-Term Evolution (LTE) RAT, and wherein the second RAT is a New Radio (NR) RAT.

9. The apparatus of claim 7, wherein the reporting circuitry is configured to provide a first reporting of the change in measurement capability via a radio resource control (RRC) message, and a second reporting of the change in measurement capability via a user equipment (UE) capability information message.

10. The apparatus of claim 7, wherein the change in measurement capability indicates a desire for a measurement gap to facilitate a measurement on one of a carrier associated with a master cell group (MCG) or a carrier associated with a secondary cell group (SCG), the reporting circuitry configured to report the desire for the measurement gap to the master node when the measurement gap facilitates an MCG carrier measurement, and the reporting circuitry configured to report the desire for the measurement gap to the secondary node when the measurement gap facilitates an SCG carrier measurement.

11. The apparatus of claim 7, wherein the change in measurement capability indicates a desire for a first measurement gap to facilitate a first measurement on a first carrier associated with a master cell group (MCG) and a desire for a second measurement gap to facilitate a second measurement on a second carrier associated with a secondary cell group (SCG), and wherein the reporting circuitry is configured to report the desire for the first measurement gap and the desire for the second measurement gap to a network node responsible for measurement gap coordination between the master node and the secondary node.

12. The apparatus of claim 11, further comprising measurement circuitry configured to perform the first measurement during the first measurement gap and the second measurement during the second measurement gap, wherein:
the first measurement gap and the second measurement gap are aligned according to a common timing reference;
the first measurement gap and the second measurement gap have a same periodicity; and
the first measurement gap and the second measurement gap have a same size, wherein the same size is a union of a first gap size associated with the first RAT and a second gap size associated with the second RAT.

13. A method of wireless communication at a scheduling entity, comprising:
establishing a communication with a scheduled entity, the communication being one of a first communication or a second communication of a dual connectivity communication with the scheduled entity, wherein the first communication is a communication with the scheduled entity according to a first radio access technology (RAT) when the scheduling entity operates as a master node, and wherein the second communication is a communication with the scheduled entity according to a second RAT when the scheduling entity operates as a secondary node;
receiving an indication from the scheduled entity of a change in measurement capability, the change in measurement capability associated with at least one of the first communication or the second communication, and wherein the change in measurement capability corresponds to a change from a gapless measurement capability where no measurement gap is necessary to a gap measurement capability where a measurement gap is desired; and reconfiguring at least one of the first communication or the second communication in response to the change in measurement capability.

14. The method of claim 13, wherein the first RAT is a Long-Term Evolution (LTE) RAT, and wherein the second RAT is a New Radio (NR) RAT.

15. The method of claim 13, wherein the receiving comprises receiving the indication of the change in measurement capability via at least one of a radio resource control (RRC) message or a user equipment (UE) capability information message.

16. The method of claim 13, the indication received from the scheduled entity including an indication of a desire for a measurement gap to facilitate a measurement on one of a carrier associated with a master cell group (MCG) or a carrier associated with a secondary cell group (SCG), wherein the indication of the desire for the measurement gap is received by the scheduling entity when operating as the master node if the measurement gap facilitates an MCG carrier measurement, and wherein the indication of the desire for the measurement gap is received by the scheduling entity when operating as the secondary node if the measurement gap facilitates an SCG carrier measurement.

17. The method of claim 16, the reconfiguring comprising a communication between the scheduling entity and a different scheduling entity that includes information associated with the indication of the desire for the measurement gap, wherein the scheduling entity is one of the master node or the secondary node, and wherein the different scheduling entity is an opposite one of the master node or the secondary node.

18. The method of claim 17, wherein the information includes a gap pattern associated with a corresponding measurement gap configuration.

19. The method of claim 13, the indication received from the scheduled entity including an indication of a desire for a first measurement gap to facilitate a first measurement on a first carrier associated with a master cell group (MCG), and the indication received from the scheduled entity further including an indication of a desire for a second measurement gap to facilitate a second measurement on a second carrier associated with a secondary cell group (SCG), wherein the receiving comprises receiving the indication from the scheduled entity when the scheduling entity is the master node.

20. The method of claim 19, wherein the reconfiguring comprises coordinating a gap alignment of the first measurement gap and the second measurement gap with the secondary node when the scheduling entity is the master node.

21. The method of claim 20, wherein the coordinating comprises:
aligning the first measurement gap and the second measurement gap according to a common timing reference;
configuring the first measurement gap and the second measurement gap to have a same periodicity; and
selecting the first measurement gap and the second measurement gap to have a same size, wherein the same size is a union of a first gap size associated with the first RAT and a second gap size associated with the second RAT.

22. An apparatus for wireless communications at a scheduling entity comprising:

a communication circuitry configured to establish a communication with a scheduled entity, the communication being one of a first communication or a second communication of a dual connectivity communication with the scheduled entity, wherein the first communication is a communication with the scheduled entity according to a first radio access technology (RAT) when the scheduling entity operates as a master node, and wherein the second communication is a communication with the scheduled entity according to a second RAT when the scheduling entity operates as a secondary node;

an indication circuitry configured to receive an indication from the scheduled entity of a change in measurement capability, the change in measurement capability associated with at least one of the first communication or the second communication, and wherein the change in measurement capability corresponds to a change from a gapless measurement capability where no measurement gap is necessary to a gap measurement capability where a measurement gap is desired; and a reconfiguration circuitry configured to reconfigure at least one of the first communication or the second communication in response to the change in measurement capability.

23. The apparatus of claim 22, wherein the first RAT is a Long-Term Evolution (LTE) RAT, and wherein the second RAT is a New Radio (NR) RAT.

24. The apparatus of claim 22, wherein the indication circuitry is configured to receive the indication of the change in measurement capability via at least one of a radio resource control (RRC) message or a user equipment (UE) capability information message.

25. The apparatus of claim 22, the indication received from the scheduled entity including an indication of a desire for a measurement gap to facilitate a measurement on one of a carrier associated with a master cell group (MCG) or a carrier associated with a secondary cell group (SCG), wherein the indication circuitry is configured to receive the indication of the desire for the measurement gap when the scheduling entity operates as the master node if the measurement gap facilitates an MCG carrier measurement, and wherein the indication circuitry is configured to receive the indication of the desire for the measurement gap when the scheduling entity operates as the secondary node if the measurement gap facilitates an SCG carrier measurement.

26. The apparatus of claim 25, the communication circuitry configured to communicate information associated with the indication of the desire for the measurement gap to a different scheduling entity, wherein the scheduling entity is one of the master node or the secondary node, and wherein the different scheduling entity is an opposite one of the master node or the secondary node.

27. The apparatus of claim 26, wherein the information includes a gap pattern associated with a corresponding measurement gap configuration.

28. The apparatus of claim 22, the indication received from the scheduled entity including an indication of a desire for a first measurement gap to facilitate a first measurement on a first carrier associated with a master cell group (MCG), and the indication received from the scheduled entity further including an indication of a desire for a second measurement gap to facilitate a second measurement on a second carrier associated with a secondary cell group (SCG), wherein the indication circuitry is configured to receive the indication of the change in measurement capability when the scheduling entity is the master node.

29. The apparatus of claim 28, wherein the reconfiguration circuitry is configured to coordinate a gap alignment of the first measurement gap and the second measurement gap with the secondary node when the scheduling entity is the master node.

30. The apparatus of claim 29, wherein the reconfiguration circuitry is configured to coordinate the gap alignment by:
- aligning the first measurement gap and the second measurement gap according to a common timing reference;
- configuring the first measurement gap and the second measurement gap to have a same periodicity; and
- selecting the first measurement gap and the second measurement gap to have a same size, wherein the same size is a union of a first gap size associated with the first RAT and a second gap size associated with the second RAT.

* * * * *